(12) United States Patent
Kawaguchi et al.

(10) Patent No.: US 12,274,935 B2
(45) Date of Patent: Apr. 15, 2025

(54) HAPTIC PRESENTATION SYSTEM AND APPARATUS

(71) Applicant: Sony Corporation, Tokyo (JP)

(72) Inventors: Hiroto Kawaguchi, Kanagawa (JP); Hironobu Abe, Kanagawa (JP); Hiroshi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 18/372,843

(22) Filed: Sep. 26, 2023

(65) Prior Publication Data

US 2024/0009554 A1 Jan. 11, 2024

Related U.S. Application Data

(63) Continuation of application No. 17/550,273, filed on Dec. 14, 2021, now Pat. No. 11,801,440, which is a
(Continued)

(30) Foreign Application Priority Data

Aug. 31, 2017 (JP) ................................. 2017-166762

(51) Int. Cl.
*A63F 13/285* (2014.01)
*G06F 3/01* (2006.01)
*G06F 3/033* (2013.01)

(52) U.S. Cl.
CPC ............ *A63F 13/285* (2014.09); *G06F 3/014* (2013.01); *G06F 3/033* (2013.01)

(58) Field of Classification Search
CPC .................................................. A63F 13/285
See application file for complete search history.

(56) References Cited

U.S. PATENT DOCUMENTS

2005/0010155 A1 1/2005 Chiang et al.
2009/0066672 A1 3/2009 Tanabe et al.
(Continued)

FOREIGN PATENT DOCUMENTS

CN 103109255 A 5/2013
CN 105718185 A 6/2016
(Continued)

OTHER PUBLICATIONS

International Search Report issued in connection with PCT/JP2018/022260, mailed Jul. 17, 2018 (2 pages).

*Primary Examiner* — Fekadeselassie Girma
*Assistant Examiner* — Mancil Littlejohn, Jr.
(74) *Attorney, Agent, or Firm* — K&L Gates LLP

(57) ABSTRACT

A haptic presentation apparatus includes a base material, an elastic layer, and a fluid transport apparatus. The base material forms a first space and includes a first through hole. The elastic layer covers a surface of the base material including the first through hole. The fluid transport apparatus injects fluid between the elastic layer and the base material via the first through hole. The elastic layer is expanded by injecting the fluid from the fluid transport apparatus such that an internal pressure of a second space between the elastic layer and the base material is higher than an internal pressure of the first space, and the fluid injected into the second space is vented to outside of the second space via a second through hole by stopping driving of the fluid transport apparatus.

22 Claims, 25 Drawing Sheets

(A)

(B)

Related U.S. Application Data continuation of application No. 16/642,735, filed as application No. PCT/JP2018/022260 on Jun. 11, 2018, now Pat. No. 11,229,837.

(56) References Cited

U.S. PATENT DOCUMENTS

| | | |
|---|---|---|
| 2012/0098789 A1 | 4/2012 | Ciesla et al. |
| 2012/0182135 A1* | 7/2012 | Kusuura ............... G06F 3/016 340/407.1 |
| 2013/0207890 A1 | 8/2013 | Young et al. |
| 2014/0160063 A1* | 6/2014 | Yairi ................ G06F 3/04886 345/173 |
| 2014/0160064 A1 | 6/2014 | Yairi et al. |
| 2015/0331528 A1* | 11/2015 | Robinson ............ G06F 3/0482 345/173 |
| 2016/0184682 A1* | 6/2016 | Wang ............... B29C 66/72941 156/60 |
| 2016/0188086 A1 | 6/2016 | Yairi et al. |
| 2016/0296838 A1 | 10/2016 | Goetgeluk et al. |
| 2017/0289956 A1* | 10/2017 | Hirozawa ............. H04W 12/02 |
| 2017/0300115 A1 | 10/2017 | Kerr et al. |
| 2020/0356242 A1 | 11/2020 | Wilson et al. |

FOREIGN PATENT DOCUMENTS

| | | | |
|---|---|---|---|
| JP | 2009-064357 A | | 3/2009 |
| JP | 2009175777 A | * | 8/2009 |
| JP | 2013-543184 A | | 11/2013 |
| JP | 2015-520455 A | | 7/2015 |
| JP | 2016-068755 A | | 5/2016 |
| WO | 2016/052513 A1 | | 4/2016 |

* cited by examiner (A)

(B)

(A)　　　　　　　　　(B)

(A)

(B)

HAPTIC PRESENTATION SYSTEM AND APPARATUS

CROSS REFERENCES TO RELATED APPLICATIONS

The present application is a continuation of U.S. patent application Ser. No. 17/550,273, filed on Dec. 14, 2021, which is a continuation of U.S. patent application Ser. No. 16/642,735, filed on Feb. 27, 2020, now U.S. Pat. No. 11,229,837, issued on Jan. 25, 2022, which application is a National Stage Entry of PCT Application No. PCT/JP2018/022260, filed on Jun. 11, 2018, which application claims priority from Japanese Patent Application No. 2017-166762, filed on Aug. 31, 2017, the contents of each are hereby incorporated by reference into this application

TECHNICAL FIELD

The present technology relates to a haptic presentation apparatus for presenting haptic feedback to a user.

BACKGROUND ART

For example, in a virtual reality technology field, it is attempted to present haptic feedback to a target in addition to visual information and auditory information. As an apparatus that presents haptic stimulation to a user, an apparatus using an air pressure is proposed.

Patent Literature 1 describes a structure that a tube expandable by an air pump is mounted around a circumference of a ring part of a steering wheel. A hollow of the tube is partitioned into a plurality of chambers by orifices. The plurality of chambers is connected by expandable connecting lids to be capable of flowing air in/out between adjacent chambers each other.

To one end of the tube, an air pump is connected and injects air into the hollow of the tube. To the other end of the tube, a vacuum pump is connected to suck air from the hollow of the tube.

When air is injected, a pressure in the chamber closest to the air pump is increased. Then, the pressure in the chamber is increased and the connecting lid arranged on the adjacent chamber is expanded. Thus, the chamber communicates with the adjacent chamber capable of flowing air and air enters into the adjacent chamber. In this way, by injecting air into the tube, the chambers are sequentially expanded from a near side to a far side of the air pump.

After all chambers are filled with air, air injection is stopped and air suction by the vacuum pump is started. Thus, all chambers are contracted. By repeating the expansion and the contraction, a driver who grips the ring part is provided with a feeling of touch that something is moved on a surface of the hand.

Patent Literature 2 describes a structure that a mobile terminal is provided with a visual haptic user interface panel. A transparent sheet configuring a part of the visual haptic user interface panel is arranged on a display panel having a flat surface and a touch panel function.

In the visual haptic user interface panel, the transparent sheet is expanded and contracted by using a pump capable of discharging and sucking fluid, and a touch operation surface is deformed to have a dome-shaped convex shape by an air pressure. By being capable of deforming the touch operation surface to have the convex shape, it is possible to convey information to a user in a visual and haptic mode.

CITATION LIST

Patent Literature

Patent Literature 1: Japanese Patent Application Laid-open No. 2016-68755
Patent Literature 2: Japanese Patent Application Laid-open No. 2009-64357

DISCLOSURE OF INVENTION

Technical Problem

In the structure described in Patent Literature 1, the driver is provided with haptic stimulation by expanding the connecting lid. In the structure described in Patent Literature 1, an internal pressure of the chamber is increased, air flows into a space between the chamber and the connecting lid, and the connecting lid is expanded. Accordingly, in order to expand the connecting lid, the internal pressure of the chamber first needs to be increased and it takes time to expand the connecting lid.

The present technology is made in view of the above-mentioned circumstances, and it is an object of the present technology to provide a haptic presentation apparatus capable of quickly deforming a surface.

Solution to Problem

In order to achieve the object, a haptic presentation apparatus according to the present technology includes a base material, an elastic layer, and a fluid transport apparatus.

The base material forms a first space and includes a first through hole.
The elastic layer covers a surface of the base material including the first through hole.
The fluid transport apparatus injects fluid between the elastic layer and the base material via the first through hole.
The elastic layer is expanded by injecting the fluid from the fluid transport apparatus such that an internal pressure of a second space between the elastic layer and the base material is higher than an internal pressure of the first space, and the fluid injected into the second space is vented to outside of the second space via a second through hole by stopping driving of the fluid transport apparatus.

With such a configuration, the elastic layer is expanded by injecting fluid into the second space and the air injected into the second space is vented via the second through hole by the elastic force that the elastic layer tries to return to an original shape. By such expansion and contraction of the elastic layer, any haptic feedback can be presented to a body part of a user being in contact with the elastic layer.

The elastic layer may be formed to be capable of coming in contact with a body part of a user, and a region of the base material covered by the elastic layer may have a convex surface with respect to the body part.

Since the region in which the elastic layer of the base material is arranged has the convex surface, the elastic layer can be made to be deformed with a low amount of fluid flow rate as compared with the case that the elastic layer is arranged on a planar surface and fluid is injected to expand the elastic layer. Accordingly, the elastic layer can be expanded or contracted in a short time, and various haptic feedback can be presented.

The region of the base material covered by the elastic layer may have a convex curved surface.

The elastic layer may have a shape including a longitudinal direction, and the elastic layer may be arranged such that the longitudinal direction is matched with a curved surface direction of the convex curved surface.

Thus, by arranging the longitudinal direction of the elastic layer so as to match with the curved surface direction of the base material body, fluid is quickly injected and vented to/from the second space as compared to by arranging the short direction of the elastic layer so as to match with the curved surface direction.

When driving of the fluid transport apparatus is stopped, a volume of the second space can be zero.

According to this structure, the internal pressure in the second space can be quickly increased with a low amount of fluid flow rate and the elastic layer can be expanded in a short time.

The fluid transport apparatus may include a vent valve that vents the fluid in the second space to the first space.

According to this structure, the fluid in the second space can be vented outside of the second space from the vent valve in addition to the second through hole, and ventilation efficiency is improved. According to this structure, contracting the elastic layer can be quickly performed.

The second through hole may be arranged in the base material, and the elastic layer may cover a surface including the first through hole and the second through hole of the base material.

According to this structure, the fluid injected into the second space is vented to the first space via the second through hole.

The second through hole may be arranged in the elastic layer.

According to this structure, the fluid injected into the second space is vented outside of the haptic presentation apparatus.

The base material may include a plurality of the first through holes, the fluid transport apparatus may be arranged for each first through hole, and the elastic layer may be arranged for each first through hole.

According to this structure, a plurality of regions each including the elastic layer that is individually expanded and contracted can be arranged. It becomes possible to present various haptic feedback.

The second space formed between the elastic layer and the base material may be divided into a plurality of regions through which fluid can move mutually.

According to this structure, as compared with the case that the second space is not divided into the plurality of regions, different haptic feedback can be presented.

The elastic layer may have a partially different thickness.

According to this structure, as compared with the elastic layer having a uniform thickness, an expansion shape of the elastic layer can be made to be different.

The elastic layer may have a protrusion on the surface.

According to this structure, as compared with the case that no protrusion is provided, different haptic feedback can be presented.

A protrusion may be arranged on a part of the region covered by the elastic layer of the base material.

According to this structure, as compared with the case that no protrusion is provided, different haptic feedback can be presented.

An inner package material arranged between the base material and the elastic layer may be further included.

According to this structure, as compared with the case that no inner package material is used, a different touch feeling can be presented to the user.

An outer package material arranged on a surface of the elastic layer at an opposite side in which the base material is arranged may be further included.

According to this structure, as compared with the case that no outer package material is used, a different touch feeling can be presented to the user.

The elastic layer may be arranged on a gripper gripped by the user.

According to this structure, various haptic feedback can be presented to hands of the user.

An external section having a third space may be further included and the base material may form the first space together with an inner wall surface of the external section in the third space.

Thus, it may provide a haptic presentation apparatus including the elastic layer inside thereof that is deformed by the fluid transport apparatus. By inserting the body part into the third space, expansion and contraction of the elastic layer allows various haptic feedback to be presented to the body part being in contact with the elastic layer.

Advantageous Effects of Invention

As described above, according to the present technology, by deforming a surface of a haptic presentation apparatus, various haptic feedback can be prevented.

MODE(S) FOR CARRYING OUT THE INVENTION

Hereinafter, embodiments of the present technology will be described with reference to the drawings.

A haptic presentation apparatus according to the embodiment uses a fluid transport apparatus and includes a surface deformation apparatus including a surface that is deformed by expanding or contracting with a feed of fluid or no feed of fluid.

The haptic presentation apparatus stimulates a body part of a user by coming in contact with a deformed part of the surface deformation apparatus that is a haptic presentation section. By controlling the number, an arrangement, a degree of deformation, and a timing of deformation of the surface deformation apparatuses, versatile pseudo haptic feedback can be presented to the user.

For example, by applying the haptic presentation apparatus to a game controller, the user can be provided with bodily sensation according to event content of the game. In addition, by presenting the haptic feedback to the user, it can encourage to draw a user's attention and also to issue an instruction to the user.

First Embodiment

This embodiment describes an example that the haptic presentation apparatus is applied to a controller of a game machine. In this embodiment, it becomes possible to provide the user with various haptic feedback when various events are generated within a game.

[Controller Structure]

Figure 1:
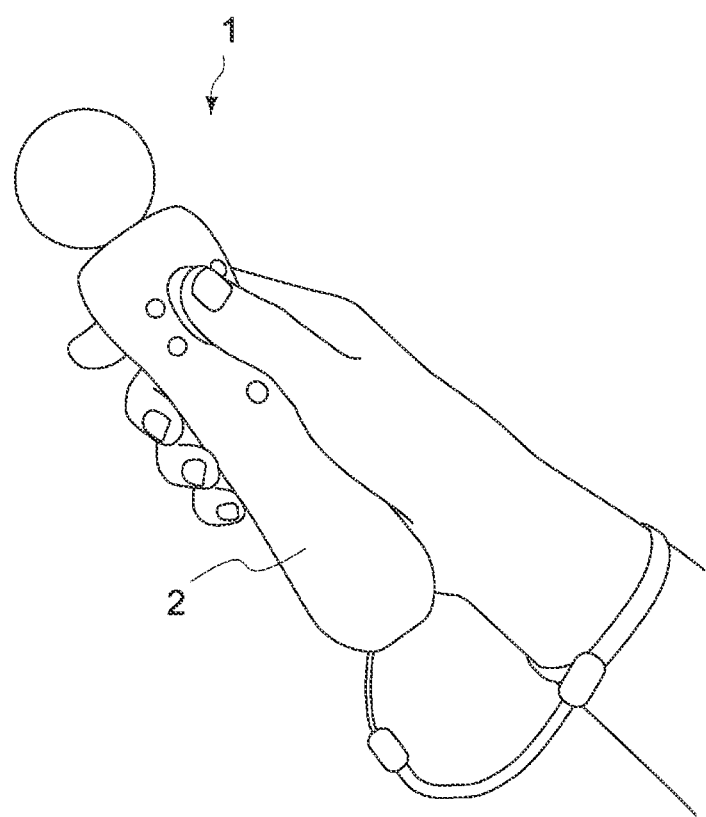
FIG. 1 is an appearance view of a controller according to an embodiment.
Figure 2:
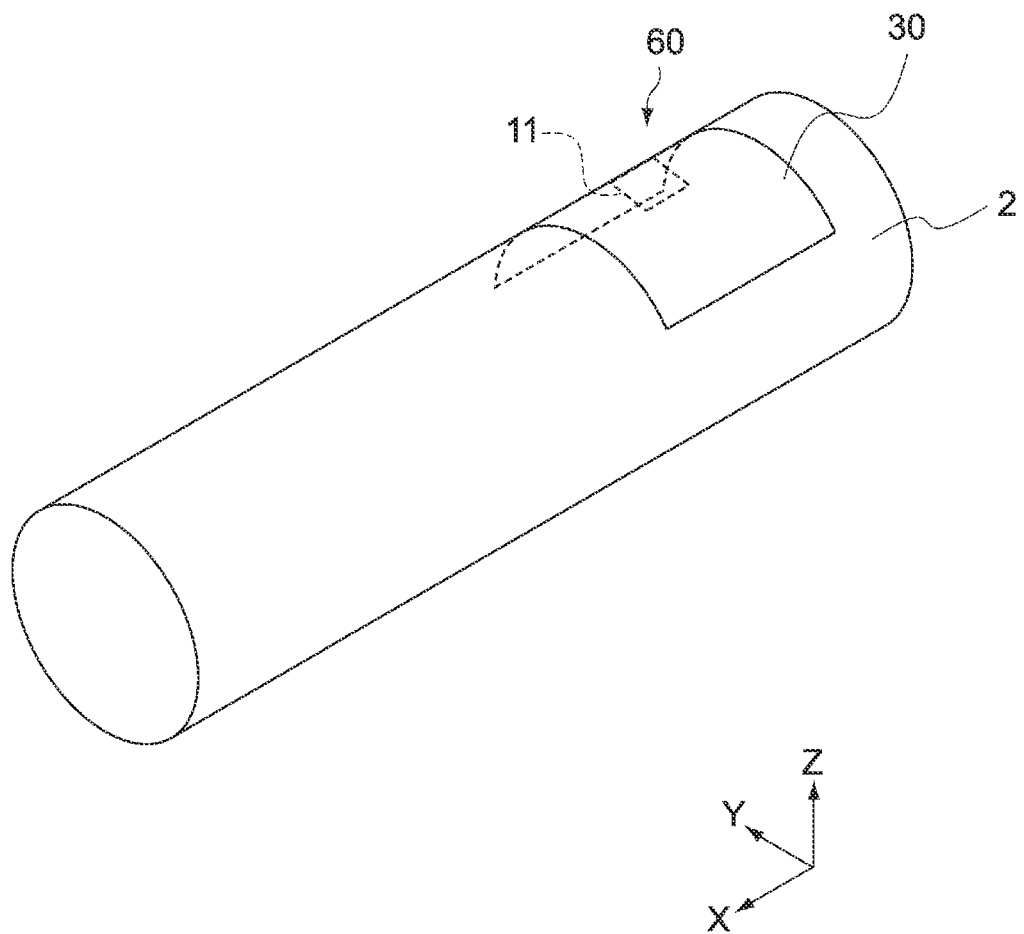
FIG. 2 is a schematic view of a base material body forming a part of the controller according to a first embodiment.

FIG. 1 is an appearance view of a controller 1 as a haptic presentation apparatus. FIG. 2 is a schematic view of a base material body forming a part of the controller 1 of FIG. 1. The controller 1 can be gripped by the user.

FIG. 3(A) is a cross-sectional view of the controller 1 having an almost cylindrical contour in a case where a region in which the deformed part of a surface deformation apparatus 60 is arranged is cut in a plane orthogonal to a longitudinal direction of the base material body. FIG. 3(A) shows a status before air is injected between a base material body 2 and an elastic layer 30. FIG. 3(B) is a partial top view of the controller 1.

Figure 4:
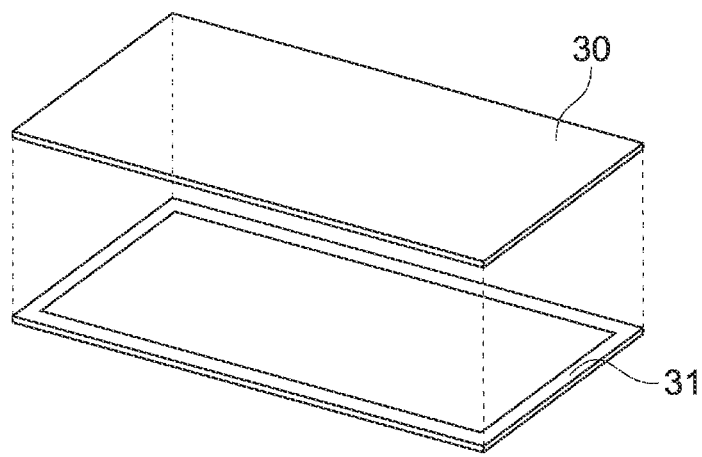
FIG. 4 is an exploded perspective view of an elastic layer and a double-sided adhesive sheet forming a part of a surface deformation apparatus included in the controller according to the first embodiment.

FIG. 4 is an exploded perspective view of an elastic layer and a double-sided adhesive sheet forming a part of the surface deformation apparatus.

Figure 5:
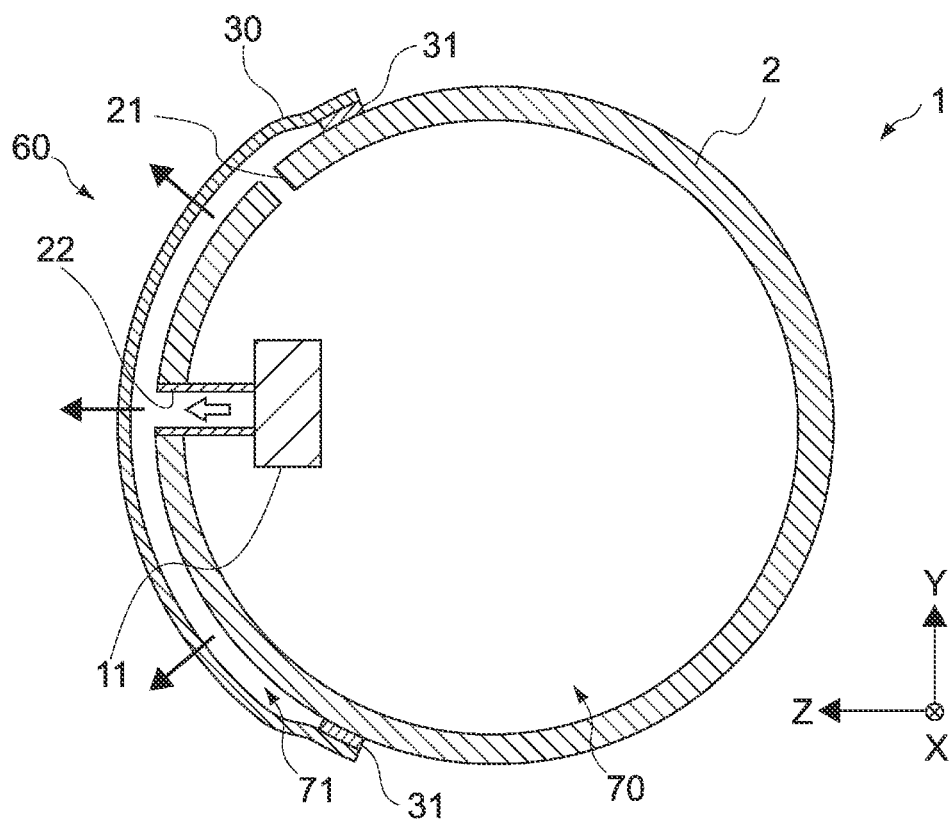
FIG. 5 is a cross-sectional view of the controller in the first embodiment and shows a status that air is injected between a base material body and the elastic layer.

FIG. 5 is a cross-sectional view of the controller 1 in a case where the region in which the deformed part of the surface deformation apparatus 60 is arranged is cut in a plane orthogonal to the longitudinal direction of the base material body. FIG. 5 shows a status that air is injected between the base material body 2 and the elastic layer 30.

FIG. 6(A) is a partial top view showing a state that the elastic layer 30 is expanded. FIG. 6(B) is a partial side view of the controller 1 showing the state that the elastic layer 30 is expanded.

Figure 7:
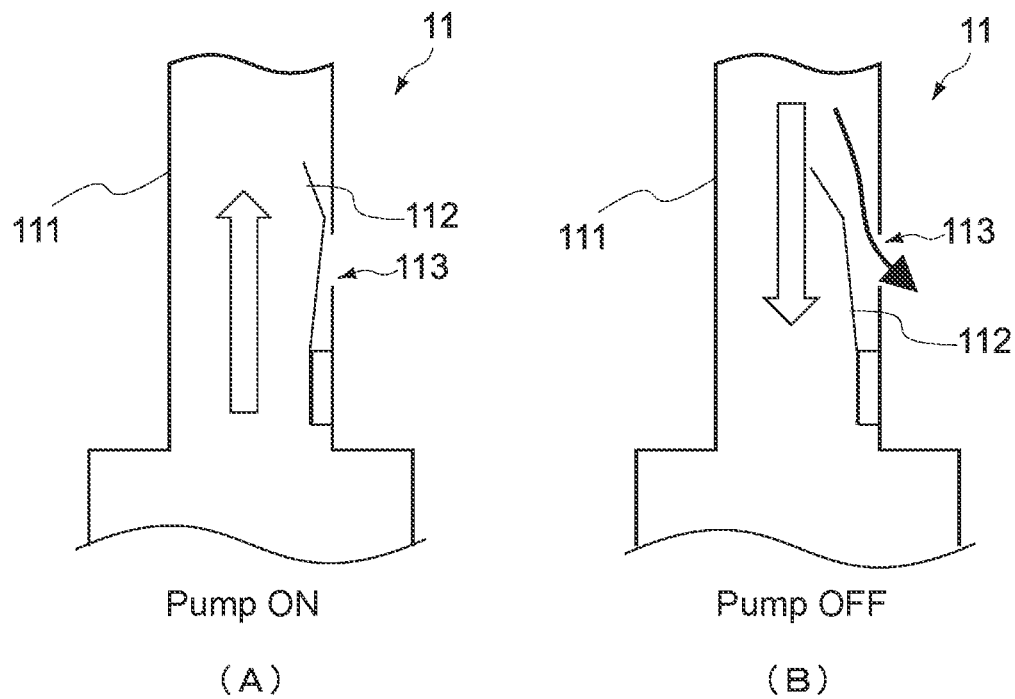
FIG. 7 are partial schematic diagrams of an air pump forming a part of the surface deformation apparatus according to the first embodiment.

FIG. 7 are partial schematic diagrams of a nozzle part of an air pump 11.

Figure 8:
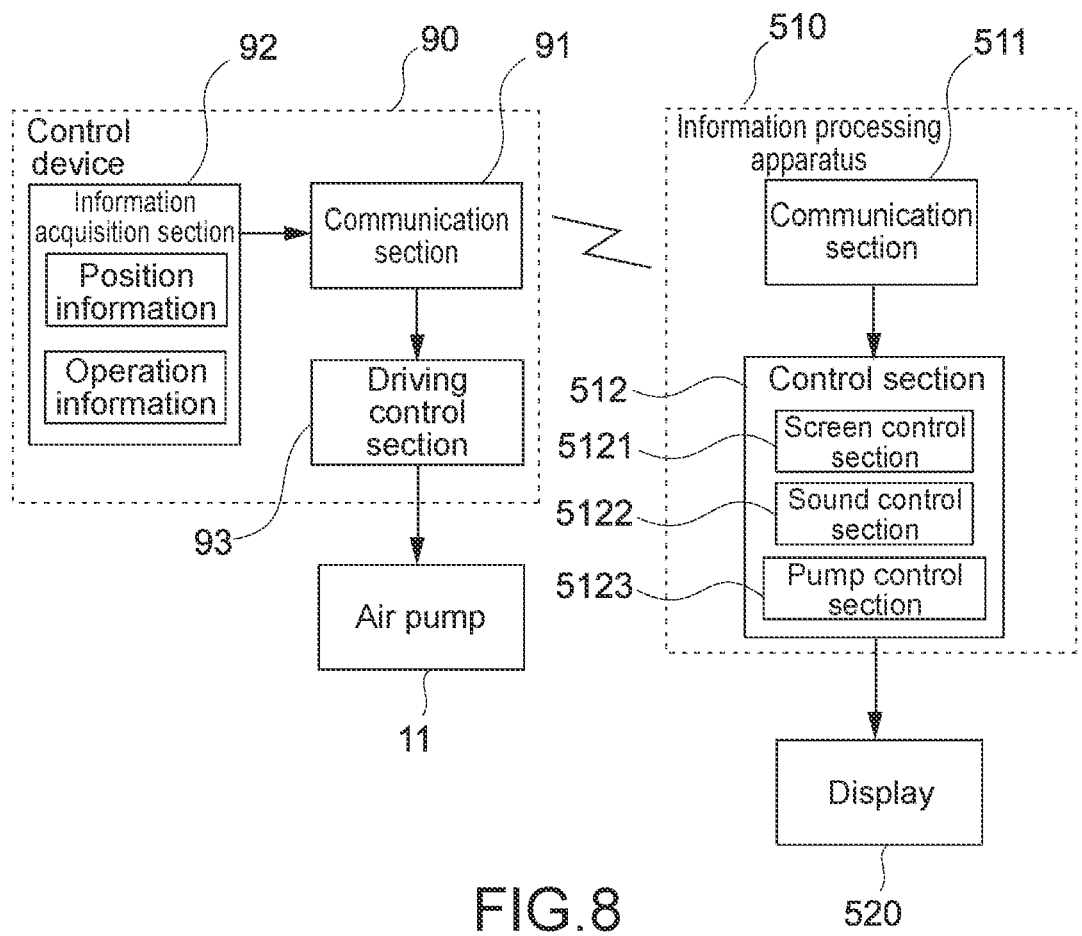
FIG. 8 is a block diagram showing a functional configuration example of a control device forming a part of the controller.

FIG. 8 is a block diagram showing a functional configuration example of a control device forming a part of the controller 1.

On a region in which the user of the controller 1 grips, the elastic layer 30 that is the deformed part of the surface deformation apparatus 60 having a lifted surface is arranged. Since the surface of a gripper region of the surface deformation apparatus 60 is lifted and deformed, a feeling of pressure is given to a palm or a finger pulp of the user.

The elastic layer 30 is formed to be capable of coming in contact with a body part of the user. In this embodiment, the elastic layer 30 is formed to be capable of coming in contact with the palm or the finger pulp of the user. Here, "capable of coming in contact" includes not only that the elastic layer 30 comes in direct contact with the body part but also that the elastic layer 30 is indirect contact with the body part via an external material, for example, as described later.

Even though something intervenes between the elastic layer 30 and the body part, if the user actually feels deformation of the elastic layer 30 on the body part, it is conceivable that the elastic layer 30 is formed to be capable of coming in contact with the body part of the user.

The deformation of the elastic layer 30 of the surface deformation apparatus 60 is controlled by supplying or not supplying air as fluid. By controlling an air supply amount, a change with time of the air supply amount, and a supply timing, various haptic feedback can be presented to the user. The haptic feedback is a feeling resulted on a surface of a skin or a mucous membrane (contact haptic feedback) or a feeling resulted when a skin surface is deformed or strained (pressure haptic feedback).

As shown in FIG. 1, the controller 1 is, for example, a controller of the game machine and has a structure that the base material body 2 can be gripped by a hand. As shown in FIG. 2, the controller 1 includes the base material body 2, the surface deformation apparatus 60, and a control device 90 of FIG. 8 described later. The base material body 2 has the almost cylindrical contour. The control device 90 is arranged inside of the controller 1.

Figure 3:
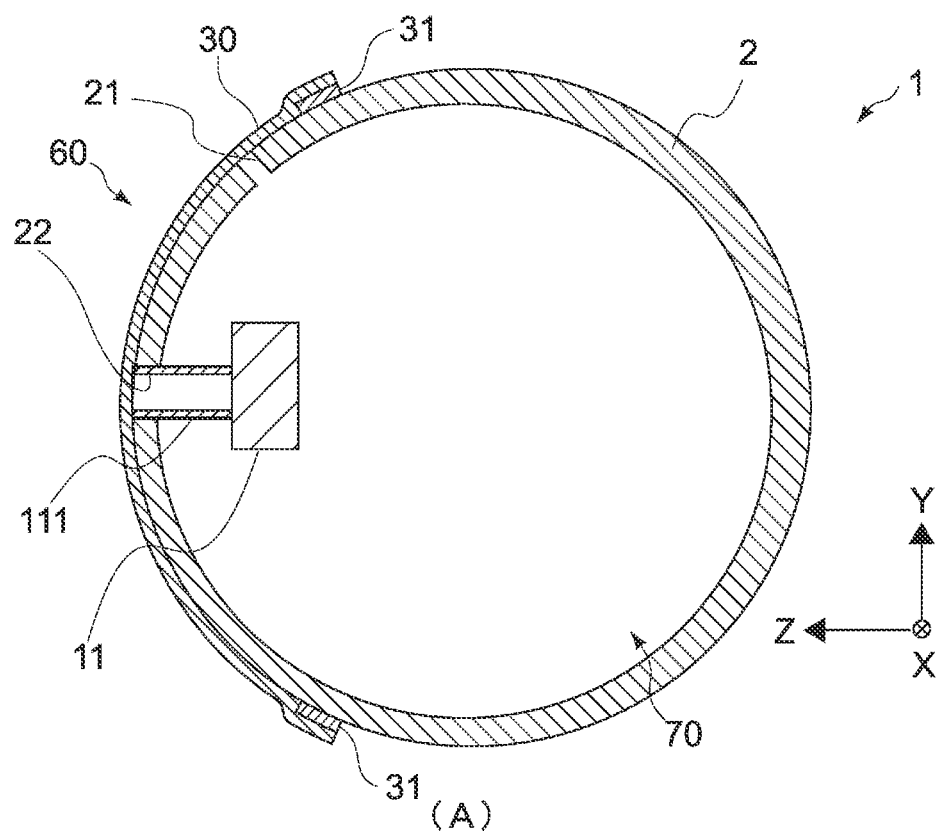
FIG. 3 are a cross-sectional view and a partial top view of the controller in the first embodiment.
Figure 3:
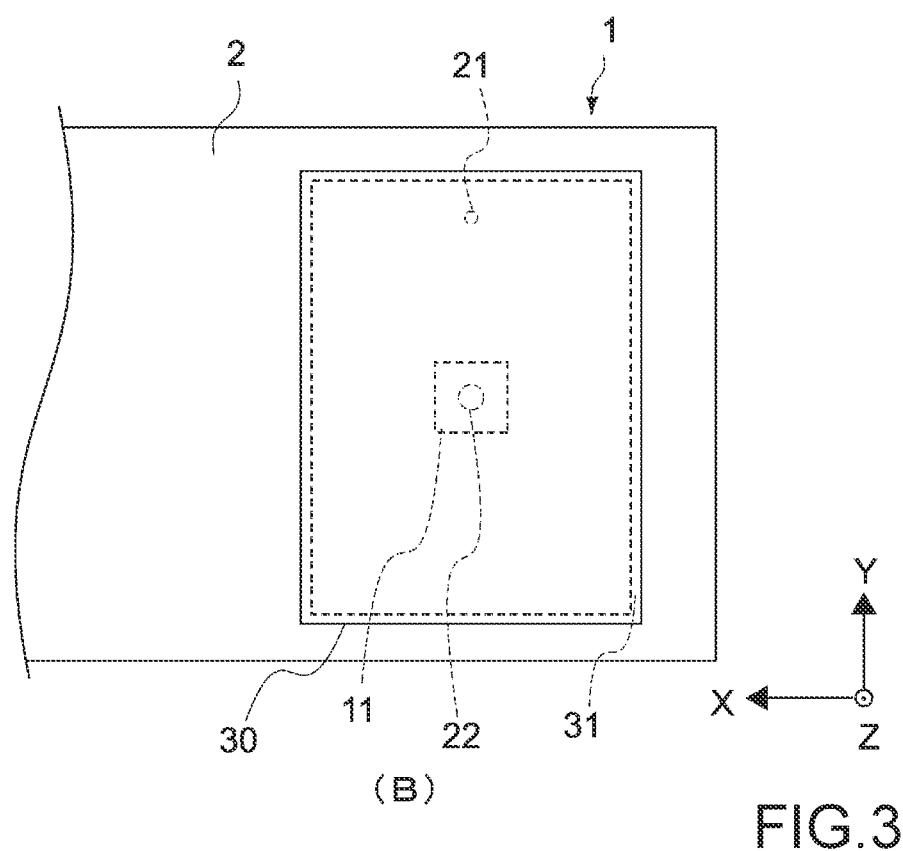

As shown in FIG. 2, on the surface of the base material body 2, the surface deformation apparatus 60 is arranged. As shown in FIGS. 3, the surface deformation apparatus 60 includes the base material body 2 as a base material, the elastic layer 30, the air pump 11 as a fluid transport apparatus that can supply air as fluid, and a double-sided adhesive sheet 31.

This embodiment describes an example that one surface deformation apparatus 60 is arranged on one controller, but the number of the surface deformation apparatus 60 is not limited thereto.

The base material body 2 has an almost cylindrical shape, the almost cylindrical contour with a diameter of about 34 mm, and a first space 70 inside thereof. The base material body 2 is formed of a material having some degree of hardness such as plastic, a metal material, and a rubber material having a predetermined thickness. The material is difficult to be deformed by an internal pressure rise in a second space 71 by driven the air pump 11 and injecting air into the second space 71 as described later.

The base material body 2 has an inlet 22 as a first through hole and a vent 21 as a second through hole at its side. To the inlet 22, the nozzle 111 of the air pump 11 is connected.

The elastic layer 30 is formed of an air impervious sealing material having an excellent extensible property. The elastic layer 30 is formed to be capable of coming in contact with the body part of the user when the user grips the controller. The elastic layer 30 is arranged on the surface of the base material body 2 so as to cover the inlet 22 and the vent 21.

As the elastic layer 30, elastomer rubber having a thickness of 25 μm can be used, for example. The elastic layer 30 has a planar rectangle shape of 20 mm×80 mm in a longitudinal direction before adhering to the base material body 2. A shape dimension shown in this embodiment is illustrative and a rectangular dimension may be fit to a size and a shape of a product, as appropriate.

As shown in FIG. 3 and FIG. 4, the elastic layer 30 is adhered to the surface of the base material body 2 via the double-sided adhesive sheet 31 having a frame shape for punching arranged along its outer periphery. By the double-sided adhesive sheet 31, the elastic layer 30 and the base material body 2 are adhered.

In the second space 71 surrounded by the double-sided adhesive sheet 31 and formed between the elastic layer 30 and the base material body 2, air can be injected via the inlet 22 by driving the air pump 11. By the internal pressure rise in the second space 71 caused by the air injection, so as not to leak the air outside of the controller 1, the elastic layer 30 is sealed by the double-sided adhesive sheet 31.

The air pump 11 is to inject air between the elastic layer 30 and the base material body 2 via the inlet 22. As shown in FIG. 5, air is supplied within the second space 71 by driving the air pump 11, the elastic layer 30 is expanded, and a volume of the second space 71 is increased. The internal pressure of the second space 71 becomes higher than the internal pressure of the first space 70.

The elastic layer 30 is desirably formed of a material having reversible elasticity within a range of an elongation rate by the expansion of the elastic layer 30 that is assumed by air supplied to the second space 71 formed between the elastic layer 30 and the base material body 2. In addition, the material and the thickness of the elastic layer 30 are selected such that the elastic layer 30 is quickly expanded by supplying air within the second space 71 and is quickly contracted by stopping air supply.

In this embodiment, the inlet 22 is arranged at a position corresponding to an almost center of the elastic layer 30, i.e., at an almost center of a region surrounded by the double-sided adhesive sheet 31. The vent 21 is arranged at a position closer to a periphery of the elastic layer 30, i.e., at an end of the region surrounded by the double-sided adhesive sheet 31.

The inlet 22 has a circle shape with a diameter of 1 mm, for example. The vent 21 has a circle planar shape with a diameter of about 0.1 mm or less, for example. Note that, in FIG. 5, each component such as the inlet 22, the vent 21, the air pump 11, and the nozzle 111 is conveniently not to scale.

In addition, the position of the inlet 22 is not limited to the position corresponding to the almost center of the region surrounded by the double-sided adhesive sheet 31. The inlet 22 may be arranged at any position. However, by considering that air isotropically flows, in order that a way of spreading air is almost uniform in-plane of the second space 71, the inlet 22 is desirably arranged at the position corresponding to the almost center of the region surrounded by the double-sided adhesive sheet 31.

Alternatively, the inlet 22 may be purposely arranged at an off-position from the center of the region surrounded by the double-sided adhesive sheet 31. This allows the way of spreading air to the second space 71 to be different from the case that the inlet 22 is arranged at the center, to thereby presenting different haptic feedback to the user.

In addition, the number of the inlet 22 is one but may be plural. In a case where there is a plurality of the inlets 22, a plurality of the inlets 22 may be arranged corresponding to one air pump 11 or each air pump 11 may be arranged for each inlet 22.

Also, during the air injection by the air pump 11, air within the second space 71 is vented to the first space 70 from the vent 21. Even if the air (fluid) supply amount (fluid flow rate) from the air pump 11 is minimum, the diameter of the vent 21 is set to have a vent amount of maintaining the status that the internal pressure of the second space 71 becomes higher than the internal pressure of the first space 70.

Any arrangement position of the vent 21 may be set. By the arrangement position of the vent, the elastic layer 30 is contracted and the user can thus be provided with the different haptic feedback. In addition, the number of the vent 21 is not limited to one and may be plural. If a plurality of the vents 21 is arranged, the arrangement positions of the vents 21 may be adjusted so as to uniformly contract the elastic layer 30 in-plane.

The region of the base material body 2 covered by the elastic layer 30 has a convex surface with respect to the body part of the user. In this embodiment, there is a convex curved surface. Since the region in which the elastic layer 30 is arranged has the convex surface, the elastic layer 30 can be made to be deformed with a low amount of air as compared with the case that the elastic layer is arranged on a planar surface and air is injected to expand.

Furthermore, in this embodiment, the base material body 2 forming a part of the second space 71 is formed of a material that is difficult to be deformed by an internal pressure rise in the second space 71 by the air injection. This allows the elastic layer 30 to be deformed so as to lift the elastic layer 30 from the base material body 2 even if an air flow rate (fluid flow rate) injected into the second space 71 is low.

Thus, since it allows the elastic layer 30 to be deformed with a low amount of the air flow rate, a deformation status of the surface deformation apparatus can be switched in a short time and it allows various haptic feedback to be presented to the user.

The elastic layer 30 having a planar rectangle shape is arranged such that its longitudinal direction (direction parallel with long side) is matched with a curved surface direction of a convex curved surface of the base material body 2 having the almost cylindrical shape.

Thus, by arranging the longitudinal direction of the elastic layer 30 so as to match with the curved surface direction of the base material body 2, air is quickly injected and vented to/from the second space 71 as compared to by arranging the short direction of the elastic layer 30 so as to match with the curved surface direction.

As shown in FIG. 3(B), the inlet 22 and the vent 21 are arranged at a position within the region partitioned by the double-sided adhesive sheet 31. The elastic layer 30 is arranged on the surface of the base material body 2 so as to cover the inlet 22 and the vent 21.

As the air pump 11, the Microblower (product name, Murata Manufacturing Co., Ltd.) can be used, for example. As shown in FIGS. 3, the air pump 11 includes the nozzle 111 and the nozzle 111 is connected to the inlet 22. As shown in FIG. 7, the nozzle 111 includes a vent valve 112.

The vent valve 112 can open or close an aperture 113 arranged at a side wall of the nozzle 111 of the air pump 11. The vent valve 112 has a plate shape having one end fixed to the nozzle 111 and the other end being bent. The vent valve 112 has a structure that the vent valve 112 moves only with respect to fluid flowing in one direction and the cavity 113 opens.

When the air pump 11 is driven and air is injected from the air pump 11 into the region of the second space 71 between the elastic layer 30 and the base material body 2, the vent valve 112 is closed by an air flow. On the other hand, when driving of the air pump 11 is stopped, the air within the second space 71 is pushed out to outside of second space 71 by an elastic force that the elastic layer 30 tries to return to an original shape.

The air pushed out to the air pump 11 from air within the second space 71 flows reversed from the air flow at the time of the air injection. The air pushed out from the second space 71 is collided with the other end of the vent valve 112, the vent valve 112 is quickly moved, and the aperture 113 opens. As the vent valve 112 opens, the air flowing from the second space 71 to the air pump 11 is vented from the aperture 113 to the first space 70.

In addition, air other than the air pushed out to the air pump 11 from air within the second space 71 is vented to the first space 70 via the vent 21. Incidentally, the air pump 11 may include no vent valve 112 and no aperture 113. In this case, air in the second space 71 is vented to the outside via only the vent 21.

Figure 6:
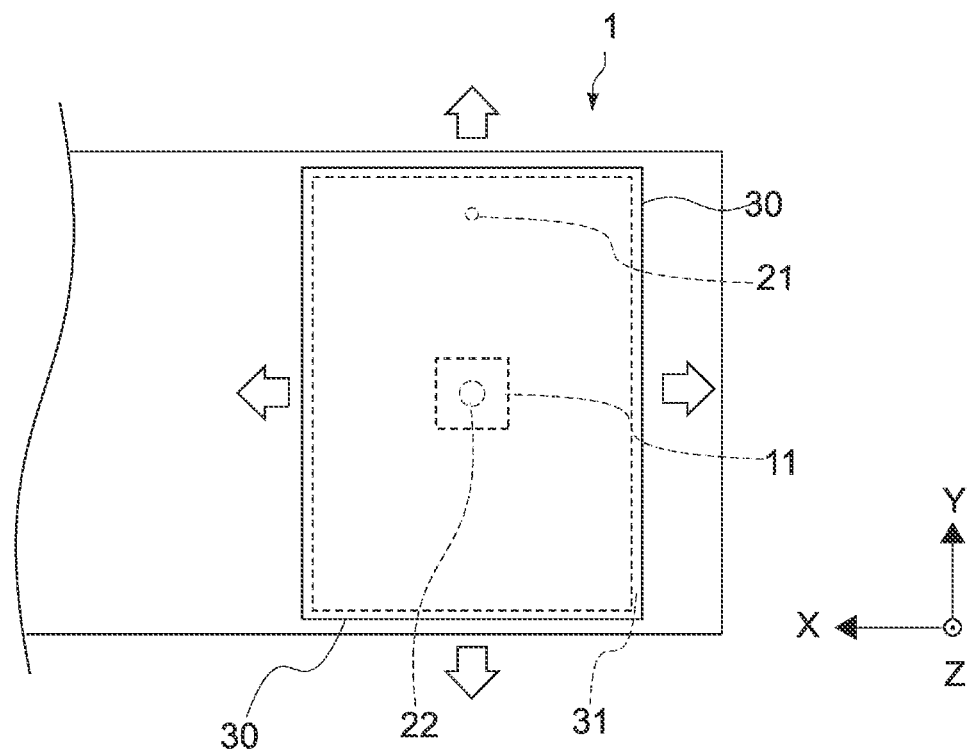
FIG. 6 are a partial top view and a partial side view of the controller in the first embodiment and show a state that air is injected between the base material body and the elastic layer.
Figure 6:
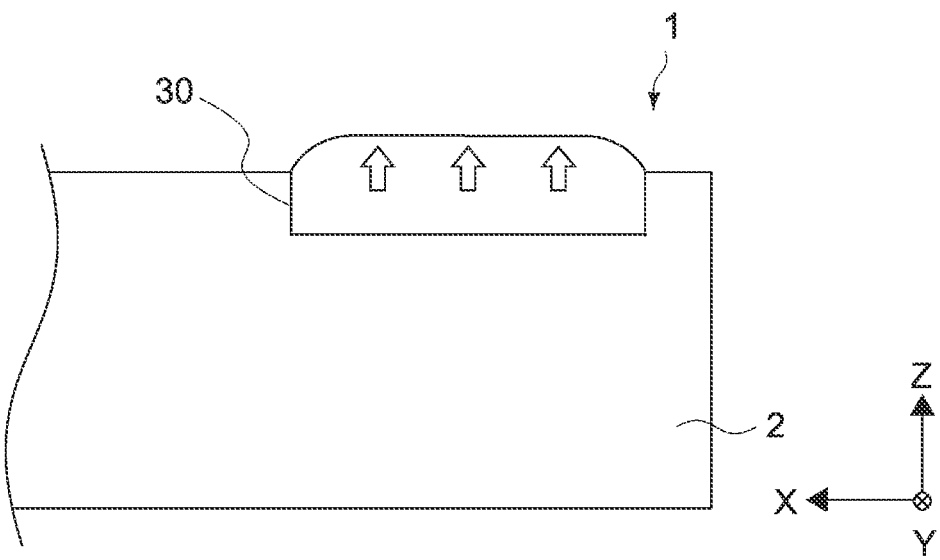

The internal pressure of the second space 71 between the elastic layer 30 and the base material body 2 becomes higher than the internal pressure of the first space 70 by injecting air supplied from the air pump 11 into the second space 71. As shown in FIG. 6 and FIGS. 7, by the air injection, the elastic layer 30 is expanded so as to spread in an outside direction.

As shown in FIGS. 3, the volume of the second space 71 is in the status of almost zero before air is injected from the air pump 11. Specifically, a hand skin that is a contact portion of the user is almost intimately in contact with the base material body 2 via the elastic layer 30.

When the air pump 11 is driven and air is injected into the second space 71, the elastic layer 30 is expanded, as shown in FIG. 5. Since the volume of the second space 71 is almost zero before driving the air pump 11, the internal pressure in the second space 71 can be quickly increased with a low amount of the air flow rate by the air injection and the elastic layer 30 can be expanded in a short time.

When driving of the air pump 11 is stopped, the air injected into the second space 71 is vented to the first space 70 via the vent 21 and the air pump 11 due to the elastic force that the elastic layer 30 tries to return to an original shape.

Thus, the second space 71 becomes contracted and the volume returns to the status of almost zero again, as shown in FIG. 3. As described above, since air is vented from two places of the vent 21 and the air pump 11, ventilation can be quickly performed and contracting the elastic layer 30 can be performed in a short time. In this manner, when the vent valve 112 and the vent 21 are arranged, ventilation efficiency is improved.

When air is injected into the second space 71, the elastic layer 30 is expanded and the user receives the feeling of pressure at the body part being in contact with the elastic layer 30. Thus, the haptic feedback that something is pushed in a direction opposite to an expansion direction the elastic layer 30, for example, can be presented to the user.

As described above, according to this embodiment, the elastic layer 30 can be expanded or contracted in a short time, the deformation status of the surface deformation apparatus can be switched in a short time, and it allows various haptic feedback to be presented to the user.

As shown in FIG. 8, the control device 90 includes a communication section 91, an information acquisition section 92, and a driving control section 93.

The information acquisition section 92 acquires position information of the controller 1 and operation information of the user.

The communication section 91 communicates with an external information processing apparatus 510 or the like wired or wirelessly, and sends and receives a signal to/from the information processing apparatus 510.

The driving control section 93 controls driving the air pump 11 on the basis of a control signal of the air pump received from the information processing apparatus 510.

The information processing apparatus 510 executes an application program of a game. The information processing apparatus 510 includes a communication section 511 and a control section 512.

The communication section 511 communicates with the control device 90 of the controller 1 or the like wired or wirelessly, and sends and receives the signal to/from the control device 90.

The control section 512 includes a screen control section 5121, a sound control section 5122, and a pump control section 5123.

The screen control section 5121 generates an image signal for displaying an image on a display 511 on the basis of the position information and the operation information received from the control device 90. The generated image signal is sent to the display 511 and a display 520 displays the image on the basis of the image signal.

A sound control section 5122 generates a voice signal of a voice output from the display 520 on the basis of the position information and the operation information received from the control device 90. The generated voice signal is sent to the display 520 and a voice is output from the display 520 on the basis of the voice signal.

A pump control section 5123 generates a control signal for driving the air pump 11 of the surface deformation apparatus 60 of the controller 1 on the basis of the position information and the operation information received from the control device 90. The control signal generated by the pump control section 5123 is sent to the control device 90.

The driving control section 93 controls a pump output of the air pump 11 (air supply amount), a pump energizing time (air supply time), a pump driving interval (timing of driving on or off air pump) on the basis of the received control signal of the air pump 11.

[Examples of Haptic Presentation]

Next, examples of the haptic presentation by the controller having the surface deformation apparatus 60 will be described by using FIG. 9 to FIG. 14. In the above-described surface deformation apparatus 60, the elastic layer 30 having a planar rectangle shape is described as an example. Here, the elastic layer 30 having a planar oval shape will be described as an example.

Figure 9:
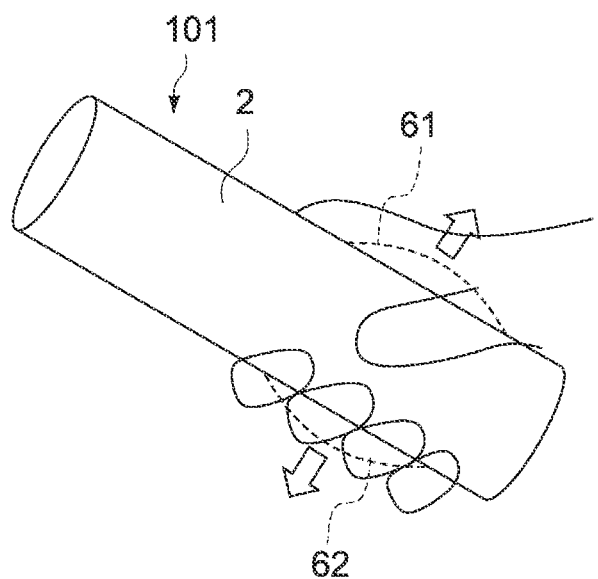
FIG. 9 shows an example of a haptic presentation by the controller including the surface deformation apparatus.

FIG. 9 is a schematic view of the controller 101 including the two surface deformation apparatuses of a first surface deformation apparatus 61 and a second surface deformation apparatus 62.

FIG. 10 to FIG. 14 are views for describing examples of the haptic feedback presented to the user by using the controller 101. Each Fig. (A) schematically shows a movement of the controller. Each Fig. (B) is a view for describing the deformation of the surface deformation apparatus for generating the movement of each Fig. (A).

As shown in FIG. 9, the controller 101 has the first surface deformation apparatus 61 and the second surface deformation apparatus 62 in which a ball of the thumb and finger pulps are located respectively when the user grips the controller 101. The two surface deformation apparatuses 61 and 62 are arranged facing each other via the base material body 2 having the almost cylindrical shape.

The first surface deformation apparatus 61 and the second surface deformation apparatus 62 can be independently driven. The structures of the first surface deformation apparatus 61 and the second surface deformation apparatus 62 are similar to that of the above-described surface deformation apparatus 60 except that a planar shape of each elastic layer 30 is different. In this case, the two inlets 22 are arranged on the base material body, the air pump 11 is arranged for each inlet 22, and the elastic layer 30 is arranged for each inlet 22.

By driving the surface deformation apparatus, air is injected into the second space between the base material body and the elastic layer, and the internal pressure in the second space becomes higher than the first space. By an increase of the internal pressure, the elastic layer is expanded and the contact portion of the user is provided with the feeling of pressure.

Figure 10:
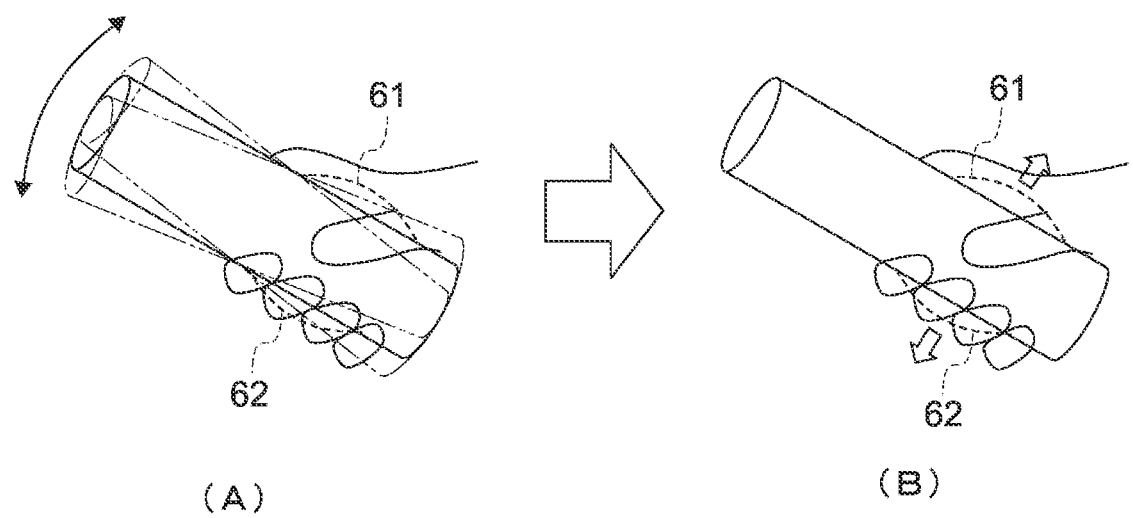
FIG. 10 shows another example of a haptic presentation by the controller including the surface deformation apparatus.

As shown in FIG. 10, the first surface deformation apparatus 61 and the second surface deformation apparatus 62 are continuously and alternately driven to repeat expansion and contraction of each of the first surface deformation apparatus 61 and the second surface deformation apparatus 62. Then, when a time length of expansion of each of the first surface deformation apparatus 61 and the second surface deformation apparatus 62 is set to the same, the user is provided with haptic feedback that the base material body 2 shakes with respect to the user taking the gripper as a fulcrum.

Figure 11:
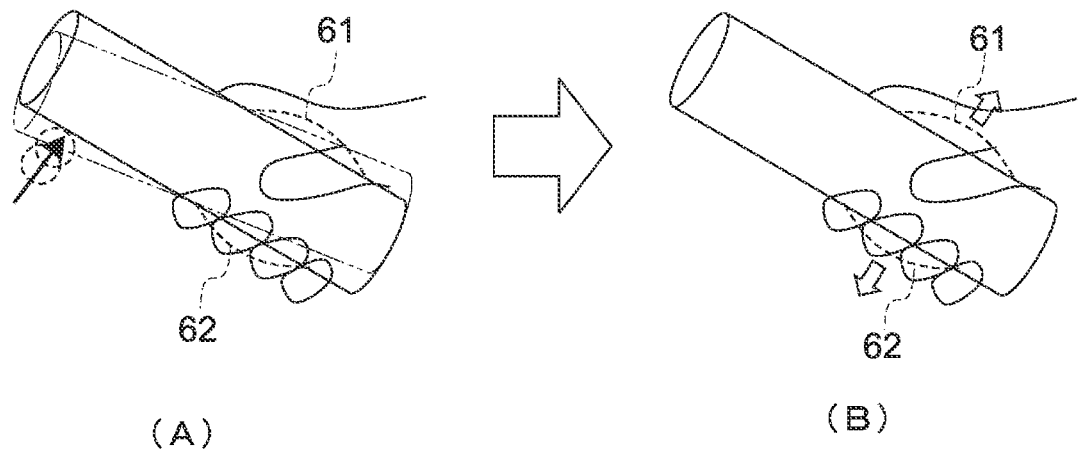
FIG. 11 shows yet another example of a haptic presentation by the controller including the surface deformation apparatus.

As shown in FIG. 11, when the second surface deformation apparatus 62 is expanded for a first length of time, the second surface deformation apparatus 62 is then contracted, and the first surface deformation apparatus 61 is expanded for a second length of time shorter than the first length of time, the user is provided with haptic feedback that an object is hit to the base material body 2.

Figure 12:
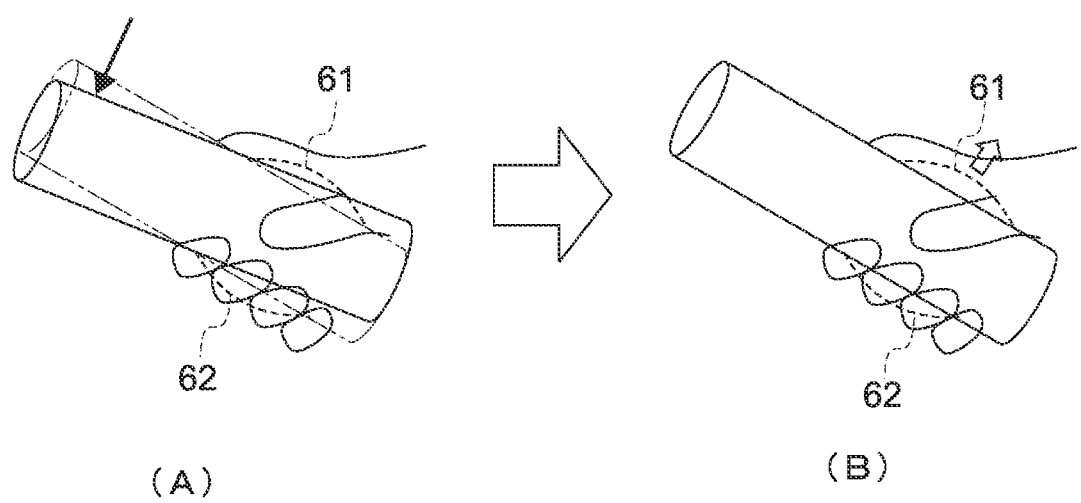
FIG. 12 shows yet another example of a haptic presentation by the controller including the surface deformation apparatus.

As shown in FIG. 12, when only the first surface deformation apparatus 61 is expanded, an upper half region in which no surface deformation apparatus of the base material body 2 is arranged is moved in a downward direction (direction opposite to direction in which the first surface deformation apparatus 61 is expanded) and the user provided with counter force haptic feedback that something is pushed-in.

Figure 13:
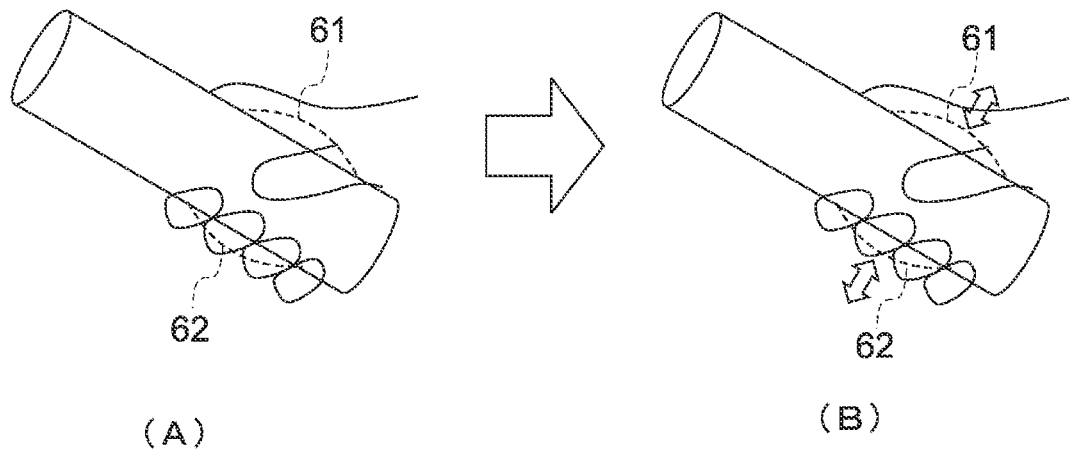
FIG. 13 shows yet another example of a haptic presentation by the controller including the surface deformation apparatus.

As shown in FIG. 13, when the first surface deformation apparatus 61 and the second surface deformation apparatus 61 are driven at the same timing to continuously repeat expansion and contraction, the user provided with a feeling of beating.

Figure 14:
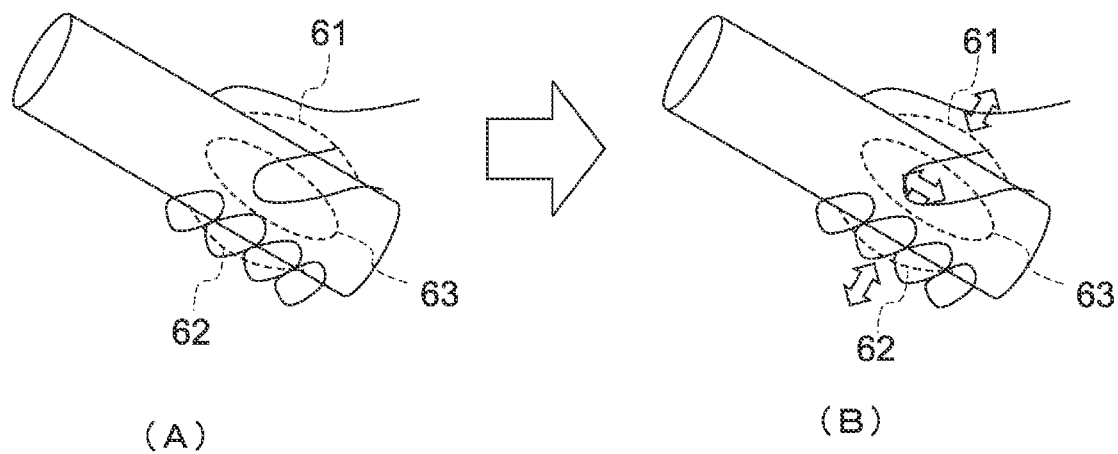
FIG. 14 shows yet another example of a haptic presentation by the controller including the surface deformation apparatus.

FIG. 14 is a movement example in a case where one third surface deformation apparatus 63 is further added. The third surface deformation apparatus 63 is arranged between the first surface deformation apparatus 61 and the second surface deformation apparatus 62 such that the third surface deformation apparatus 63 is roughly positioned at a palm when the user grips the controller 1.

When the second surface deformation apparatus 62, the third surface deformation apparatus 63, and the first surface deformation apparatus 61 are sequentially and repeatedly expanded, the user is provided with haptic feedback that something is moved around.

In this case, when the air supply amount (fluid flow rate) is adjusted to decrease a degree of expansion, for example, the user is provided with haptic feedback that something crawls on a hand surface. On the other hand, when the air supply amount is adjusted to increase the degree of expansion, the user is provided with haptic feedback that something is dug in the skin and is moved around as compared with the case that the degree of expansion is small.

Thus, even if the timing of driving the surface deformation apparatuses is the same, the user provided with different haptic feedback depending on a deformation amount (air supply amount).

As described above, reversible deformation by expansion and contraction of the elastic layer 30 by using the air pump 11 is utilized to be capable of providing the user with artificial haptic feedback. By changing the timing of driving on or off the air pump 11 of the surface deformation apparatus 60, adjustment of the air supply amount, the air supply time, and the number of the surface deformation apparatus 60 as appropriate, it is possible to provide the user with various haptic feedback.

Note that, in this embodiment, the Microblower is taken as an example of the fluid transport apparatus, but is not limited thereto. As the fluid transport apparatus for inducing the increase in the internal pressure of the second space 71, a pump of an electromagnetic induction type actuator, a diaphragm type pump using a piezoelectric vibrator, or the like may be used. In addition, the fluid is not limited to air, but may be gas such as helium, or liquid such as water or oil.

Furthermore, here, it illustrates that the air pump is arranged in the base material body 2, but may be arranged outside of the base material body 2. In this case, the nozzle of the air pump may be connected to the inlet of the base material body via piping.

Second Embodiment

In the first embodiment, the controller has the almost cylindrical contour, but is not limited thereto. For example, a shape corresponding to content of the game and a shape that is easily gripped by the user.

Figure 15:
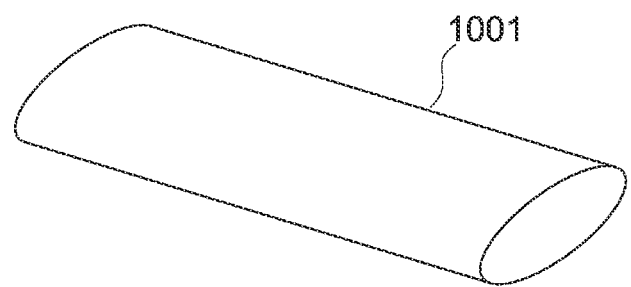
FIG. 15 shows another shape example of a controller in a second embodiment.
Figure 16:
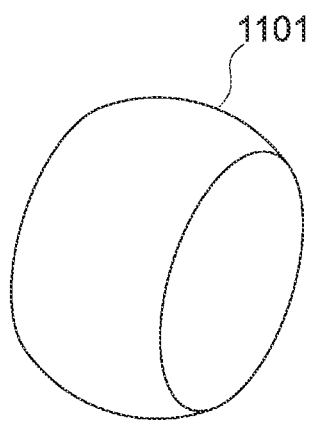
FIG. 16 shows yet another shape example of the controller.
Figure 17:
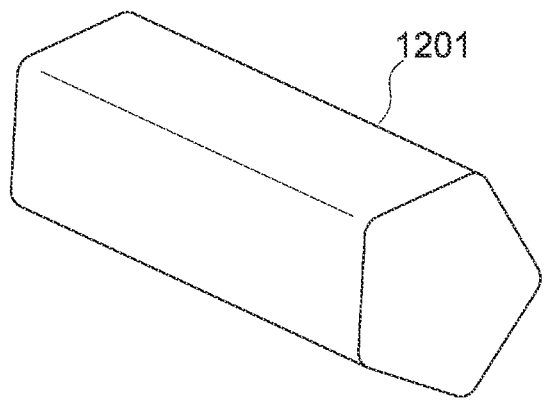
FIG. 17 shows yet another shape example of the controller.

FIG. 15 to FIG. 18 are other shape examples of the controller. As shown in FIG. 15, it may be a controller 1001 having an elliptic cylindrical shape, as shown in FIG. 16, it may be a controller 1101 having a spherical trapezoid shape provided by cutting a sphere with two parallel planar surfaces. As shown in FIG. 17, it may be a controller 1201 having a roughly pentagonal prism shape. Also, it may be a haptic presentation apparatus having a pen shape.

Figure 18:
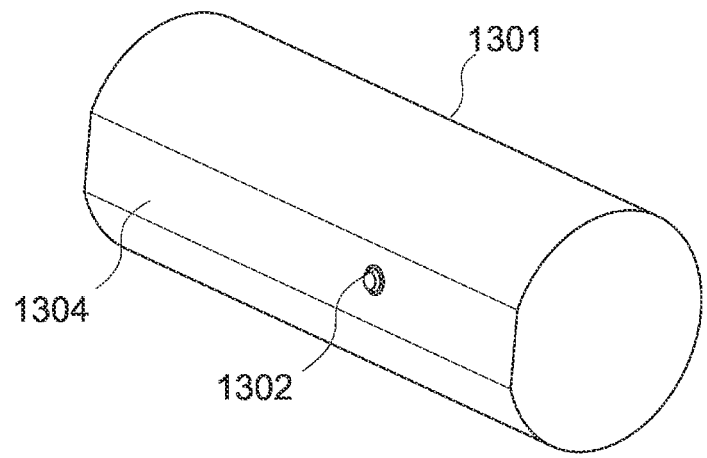
FIG. 18 shows yet another shape example of the controller.

In addition, as shown in FIG. 18, it may be a controller 1301 having a shape that a cylinder has a planar surface 1304 on a part of a side surface and a protrusion 1302 is locally arranged on the planar surface 1304. In a case where the protrusion 1302 is arranged, the elastic layer of the surface deformation apparatus is arranged so as to cover the protrusion. In addition, a concave portion may be arranged instead of the protrusion.

In this manner, the shape of the controller having the outer surface that forms the gripper being in contact with the body part of the user can be variously set taking assumed operability of the controller into consideration.

Third Embodiment

In the above-described embodiments, the second space 71 formed between the elastic layer 30 and the base material body 2 has no barrier. For example, the second space 71 may be divided into a plurality of regions through which air can move mutually.

Figure 19:
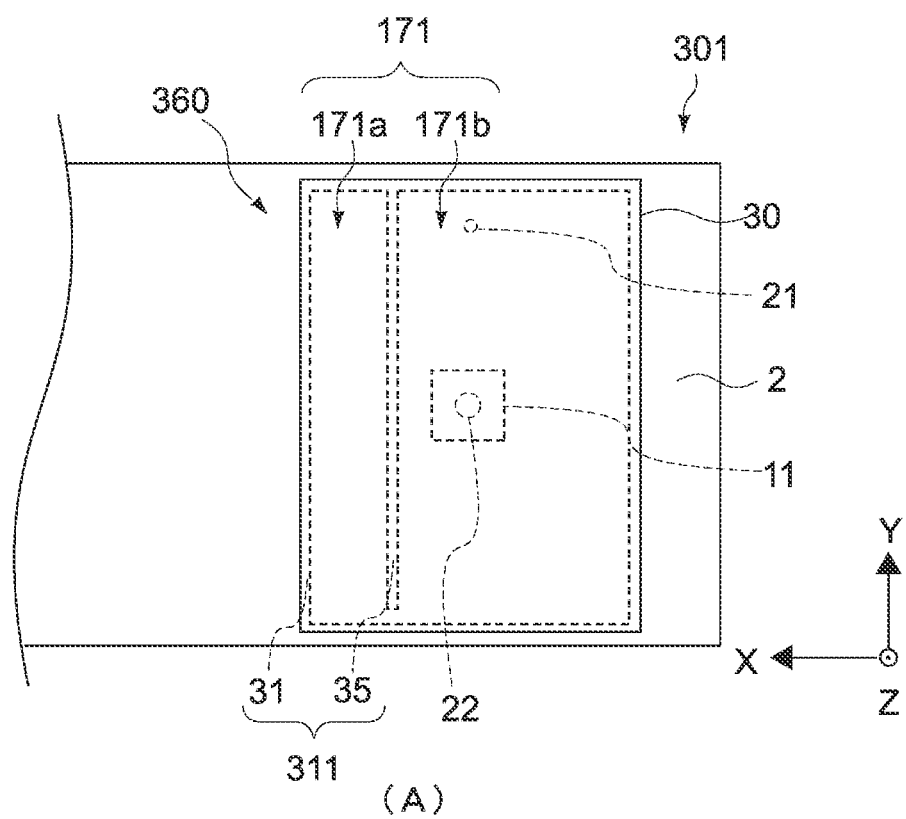
FIG. 19 are a partial top view and a partial side view of a controller according to a third embodiment.
Figure 19:
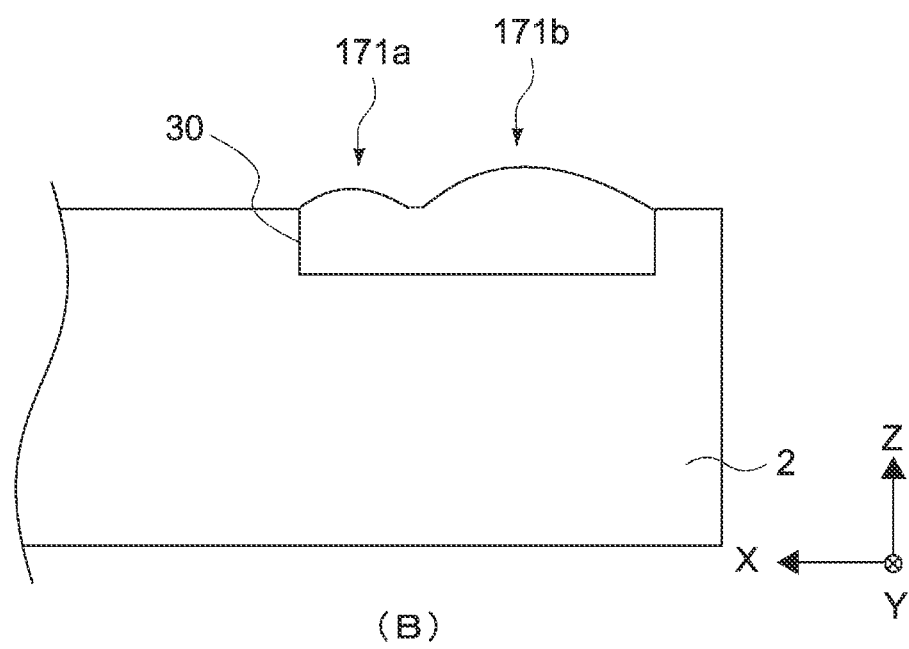

Hereinafter, FIG. 19 are used for description. In this embodiment, as compared with the first embodiment, only the shape of the double-sided adhesive sheet of the surface deformation apparatus is different and other configurations are the same. Similar configurations are denoted by the similar reference signs, and different configurations will be mainly described.

FIG. 19(A) is a partial top view of the controller 301 in this embodiment. FIG. 19(B) is a partial side view of the base material body 2 showing a state that the elastic layer 30 is expanded.

As shown in FIG. 19(A), the surface deformation apparatus 360 includes the double-sided adhesive sheet 311. The double-sided adhesive sheet 311 includes the double-sided adhesive sheet 31 having a frame shape and the double-sided adhesive sheet 35 having a rod shape. By the double-sided adhesive sheet 311, the elastic layer 30 is adhered to the base material body 2.

A longitudinal direction of the double-sided adhesive sheet 35 having the rod shape is positioned in parallel with a long side of the double-sided adhesive sheet 31 having the rectangular frame shape. One end of the double-sided adhesive sheet 35 is connected to the double-sided adhesive sheet 31 having the rod shape and the other end is separated from the double-sided adhesive sheet 31 having the frame shape.

Since there is the double-sided adhesive sheet 35 having the rod shape, the second space 171 formed between the elastic layer 30 and the base material body 2 is divided into two first expansion region 171a and a second expansion region 171b through which air can move mutually.

Figure 39:
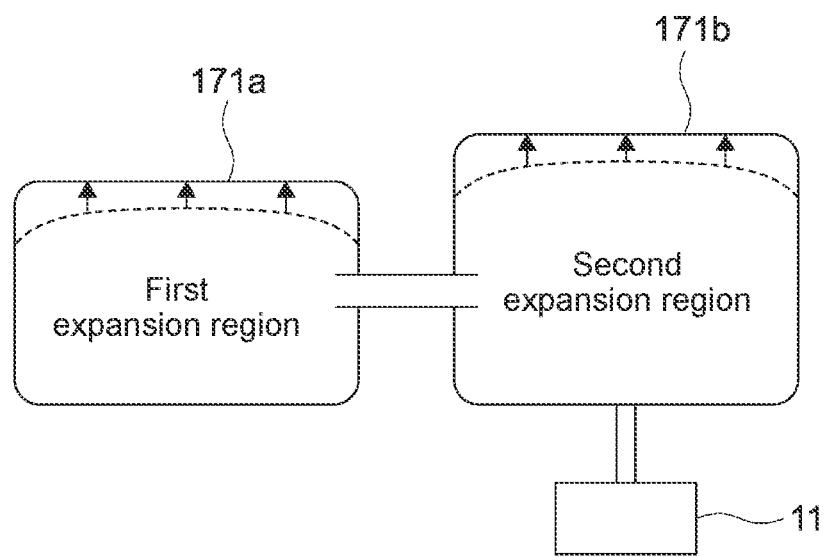
FIG. 39 is a diagram for describing a function of regions and the air pump when a second space formed between the elastic layer and the base material body is divided into a plurality of expansion regions through which air can move mutually.

FIG. 39 is a schematic diagram for describing a function of the first expansion region 171a, the second expansion region 171b, and the air pump 11.

In this embodiment, air is supplied to the first expansion region 171a and the second expansion region 171b via the same air pump 11. The double-sided adhesive sheet 35 having the rod shape forms a barrier that partially separates the first expansion region 171a from the second expansion region 171b. By the driving of the air pump 11, the second expansion region 171b is first expanded in which the inlet 22 is located.

Thereafter, air is injected into the first expansion region 171a through the part in which the first expansion region 171a and the second expansion region 171b are spatially connected to expand the first expansion region 171a.

As shown in FIG. 19(B), when air is supplied from the air pump 11 to the second space 71, air is injected into each of the first expansion region 171a and the second expansion region 171b and the elastic layer 30 is expanded in two mountain-like shapes.

In this manner, in this embodiment, since the elastic layer 30 is stepwise deformed in the order of the second expansion region 171b and the first expansion region 171a, the user can be provided with the haptic feedback that something is moved within a hand, for example.

Figure 20:
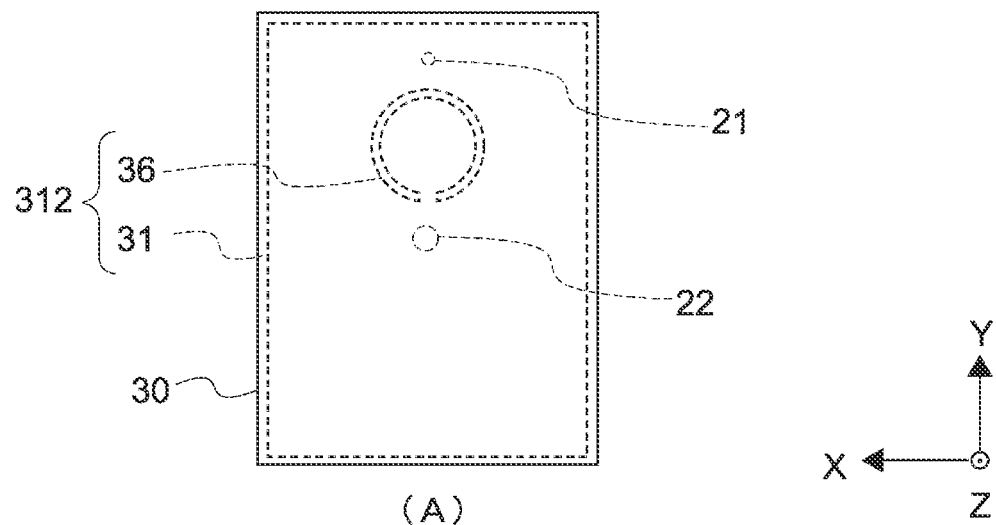
FIG. 20 show another shape examples of the double-sided adhesive sheet.
Figure 20:
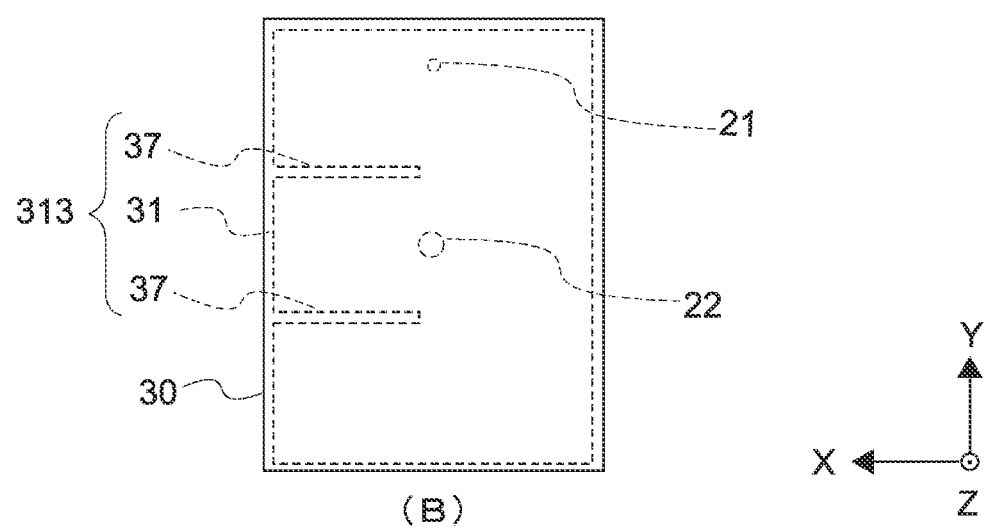
Figure 20:
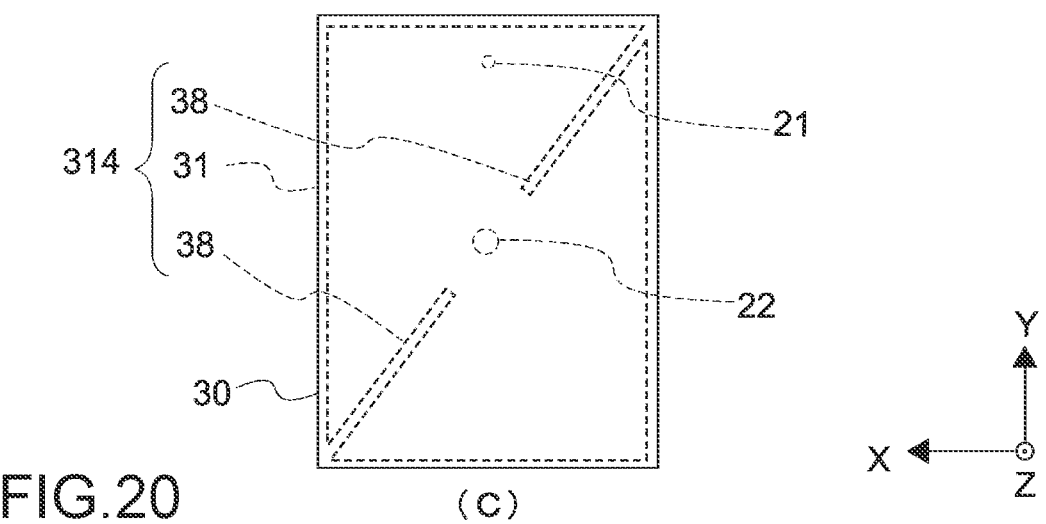

Here, the double-sided adhesive sheet 35 having the rod shape is arranged, but the shape is not limited thereto. For example, as shown in FIGS. 20(A) to (C), it can take a variety of shapes. In addition to the double-sided adhesive sheet 31 having the frame shape, the double-sided adhesive sheet having other shape is arranged. As a result, an expansion shape of the elastic layer 30 can be changed.

FIG. 20(A) is an example that a double-sided adhesive sheet 312 is arranged that includes the double-sided adhesive sheet 31 having the frame shape and a double-sided adhesive sheet 36 having a circle frame shape partly broken arranged between the inlet 22 and the vent 21. Also in this case, the second space is divided into two expansion regions through which air can mutually move.

As a shape of the double-sided adhesive sheet 312 shown in FIG. 20(A), a part of a rectangular elastic layer is hollowed in an almost ring shape by injection of air.

FIG. 20(B) is an example that a double-sided adhesive sheet 313 is arranged that includes the double-sided adhesive sheet 31 having the frame shape and two double-sided adhesive sheets 37 having the rod shapes. Respective longitudinal directions of the two double-sided adhesive sheets 37 having the rod shapes are arranged in parallel with a short side of a rectangular double-sided adhesive sheet 31 having the frame shape, and the two double-sided adhesive sheets 37 are arranged at a position that divides three roughly equal parts of a long side of the double-sided adhesive sheet 31 having the frame shape.

The length of each of the two double-sided adhesive sheets 37 having the rod shapes is half of the length of short side of the double-sided adhesive sheet 31 having the frame shape. In this case, the second space is partially divided into three expansion regions.

FIG. 20(C) is an example that a double-sided adhesive sheet 314 is arranged that includes the double-sided adhesive sheet 31 having the rectangular frame shape and two double-sided adhesive sheets 38 having rod shapes faced each other across the inlet 22 arranged on the diagonal line of the double-sided adhesive sheet 31 having the frame shape.

Also, in this case, the second space is divided into the two expansion regions through which air can move mutually. Since the inlet 22 is arranged at the center of a border line of the two expansion regions, the two expansion regions are expanded at the same time. By the expansion of the two expansion regions, two convex portions having planar shapes of triangles are formed.

As described above, by arranging the double-sided adhesive sheet such that the second space formed between the elastic layer and the base material body is divided into a plurality of regions through which air can move mutually, one air pump can present various haptic feedback. In addition, by changing the shape and the arrangement position of the double-sided adhesive sheet, and the arrangement position of the inlet and the vent, various haptic feedback can be presented.

Fourth Embodiment

In each of the above-described embodiments, an inner package material may be further arranged between the elastic layer and the base material body. For the inner package material, a thin foam sheet can be used, for example. By using the foam sheet, a feeling of touch can be changed when the controller is gripped. The foam sheet functions as a layer adding a feeling of touch.

In this embodiment, as compared with the above-described embodiments, only the presence or absence of the foam sheet is different and other configurations are the same. Similar configurations are denoted by the similar reference signs, and different configurations will be mainly described.

Figure 21:
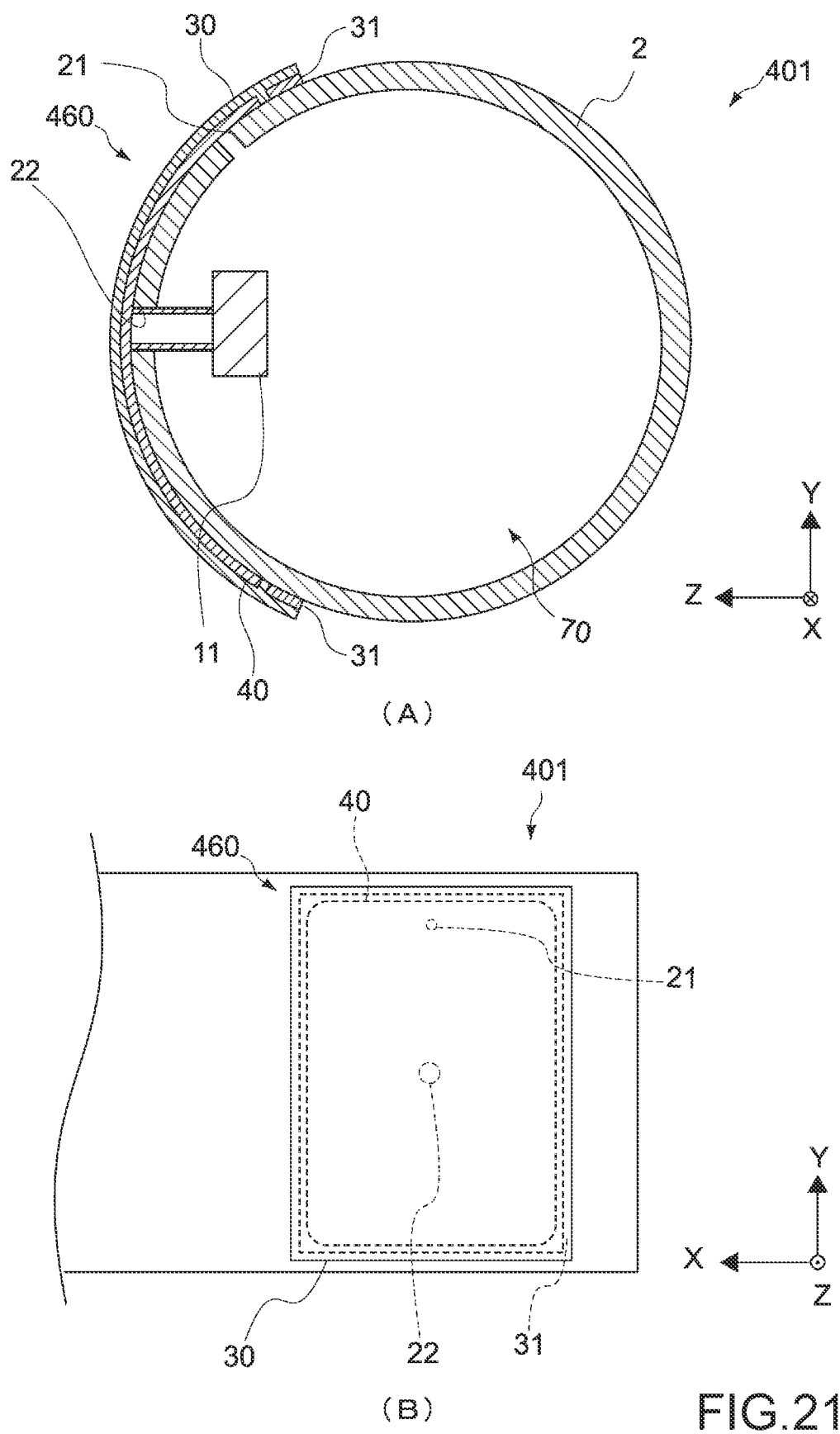
FIG. 21 are a partial top view and a partial side view of a controller according to a fourth embodiment.

FIG. 21(A) is a cross-sectional view when a region in which a surface deformation apparatus 460 of a controller 401 arranged as the haptic presentation apparatus in this embodiment is cut in a plane orthogonal to the longitudinal direction of the haptic presentation apparatus 401. FIG. 21(B) is a partial top view of the controller 401.

The controller 401 includes the surface deformation apparatus 460. Similar to each of the above-described embodiments, when the user grips the controller 401, the surface deformation apparatus 460 is arranged at a body part of the user, here a region in contact with a hand.

The surface deformation apparatus 460 includes the base material body 2 as the base material, the elastic layer 30, the air pump 11 as the fluid transport apparatus that can supply air as fluid, and a foam sheet 40 as the inner package material.

The foam sheet 40 has a substantially rectangular planar shape with one size smaller than an inner periphery of the double-sided adhesive sheet 31 having the frame shape and is arranged in the double-sided adhesive sheet 31 having the frame shape. The foam sheet 40 is arranged between the elastic layer 30 and the base material body 2 and is adhered to the base material body 2.

The foam sheet 40 includes through holes at regions corresponding to the inlet 22 and the vent 21 and has a shape that does not prevent injection and vent.

As the foam sheet 40, porous polyurethane, PORON®, or the like can be used, for example. By using the foam sheet 40, the controller 460 can be provided with cushioning properties. In this manner, when the user grips, the user can be provided with a soft sense of touch with hardness of the base material body 2 being relieved.

Figure 22:
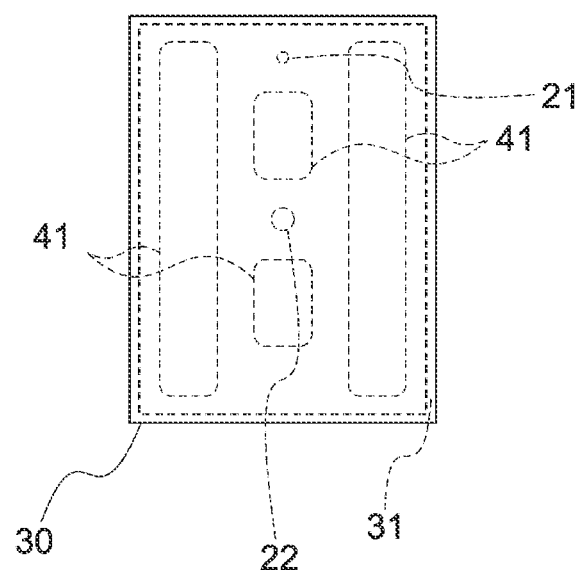
FIG. 22 is a view showing an arrangement example of another foam sheet.

Here, the foam sheet 40 has the substantially rectangular planar shape but the shape, the size, the number, and the arrangement place are not limited thereto. For example, as shown in FIG. 22, four foam sheets 41 may be arranged in the double-sided adhesive sheet 31 having the frame shape and can be arranged in accordance with the haptic feedback to be presented.

In addition, this embodiment illustrates that the foam sheet 40 is adhered to the base material body 2, but the foam sheet 40 may not be adhered to the base material body 2 but may be inserted into simply between the base material body 2 and the elastic layer 30.

Fifth Embodiment

In the fourth embodiment, the foam sheet 40 is arranged between the elastic layer 30 and the base material body 2 as the inner package material. However, the foam sheet may be arranged on a surface of the elastic layer 30 at an opposite side in which the base material 2 is arranged, i.e., at a surface of a side with which the body part of the user is in contact.

Figure 23:
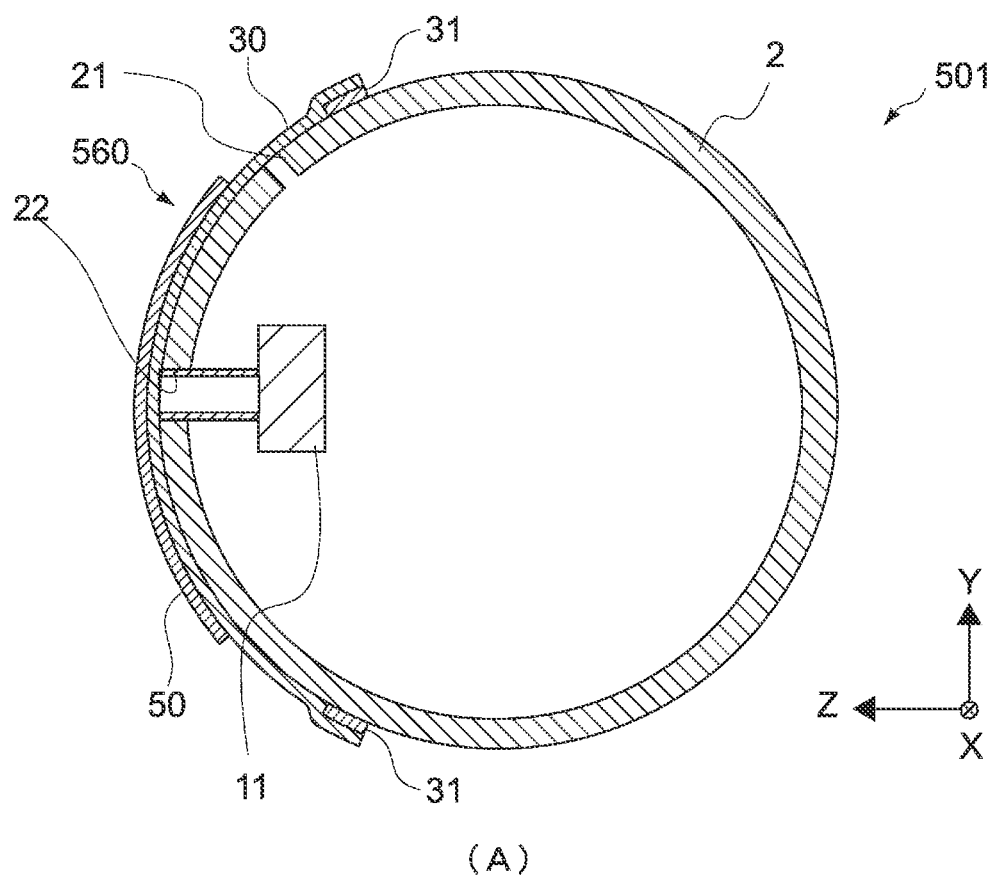
FIG. 23 are a cross-sectional view and a partial top view of a controller according to a fifth embodiment.
Figure 23:
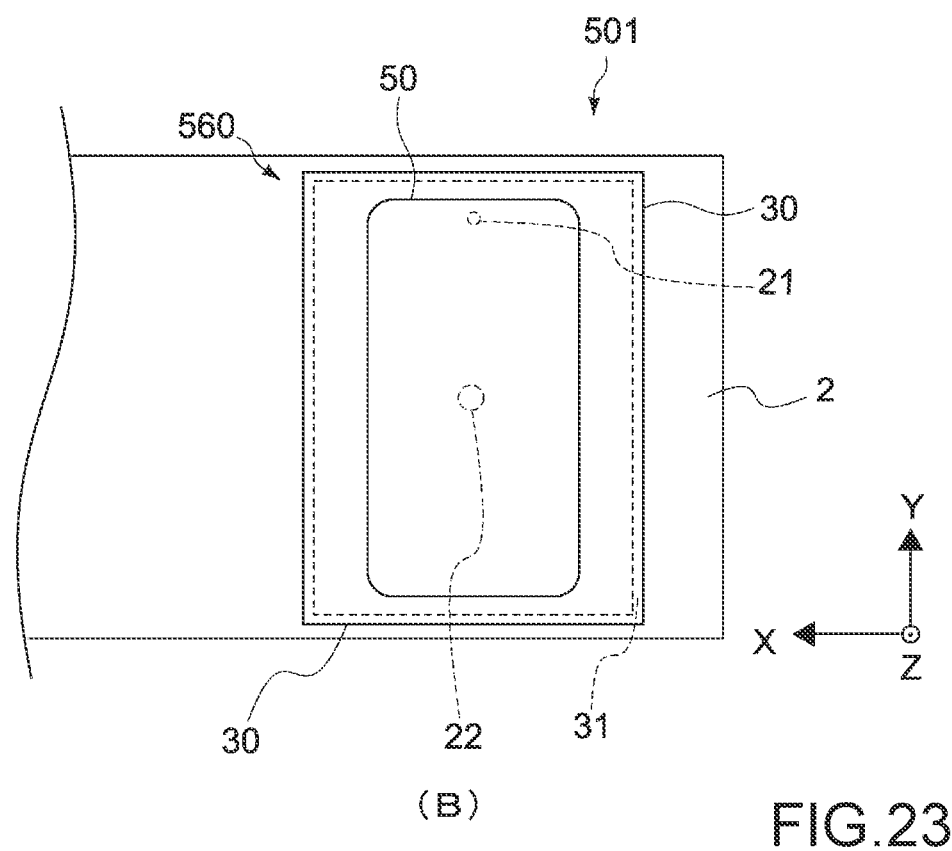

FIG. 23(A) is a cross-sectional view when a region in which a surface deformation apparatus 506 of a controller 501 arranged as the haptic presentation apparatus in this embodiment is cut in a plane orthogonal to the longitudinal direction of the controller 501. FIG. 23(B) is a partial top view of the controller 501.

The controller 501 includes the surface deformation apparatus 560. Similar to each of the above-described embodiments, when the user grips the controller 501, the surface deformation apparatus 560 is arranged at the body part of the user, here the region in contact with the hand.

The surface deformation apparatus 560 includes the base material body 2 as the base material, the elastic layer 30, the air pump 11 as the fluid transport apparatus that can supply air as fluid, and a foam sheet 50 as the outer package material.

The foam sheet 50 has a substantially rectangular planar shape with one size smaller than the inner periphery of the double-sided adhesive sheet 31 having the frame shape and is arranged in the region surrounded by the double-sided adhesive sheet 31 having the frame shape. The foam sheet 50 is adhered to the surface of the elastic layer 30 at the opposite side with which the base material body 2 is in contact. When air is supplied to the second space formed between the elastic layer 30 and the base material body 2, the shape of the foam sheet 50 is changed following the expansion of the elastic layer 30.

As the foam sheet 50, porous polyurethane, PORON (registered trademark), or the like can be used, for example. By using the foam sheet 50, the surface deformation apparatus 560 can be provided with cushioning properties.

In this manner, when the user grips, the user can be provided with a soft feeling of touch with hardness of the base material body 2 being relieved. The foam sheet functions as the layer that adds the feeling of touch.

In addition, this embodiment illustrates that the foam sheet is used as the layer that adds the feeling of touch. However, a material that provides the user with a cool touch feeling or a warm touch feeling may be used. In this manner, when the user grips, the user can be provided with the feeling of touch such as a cool feeling and a warm feeling. In addition, a material that adds the cool feeling or the warm feeling and a foam sheet that adds a soft feeling of touch may also be combined.

Here, the foam sheet 50 has a substantially rectangular shape with one size smaller than the inner periphery of the double-sided adhesive sheet 31 having the frame shape, but the shape, the size, the number, and the arrangement place are not limited thereto.

Figure 24:
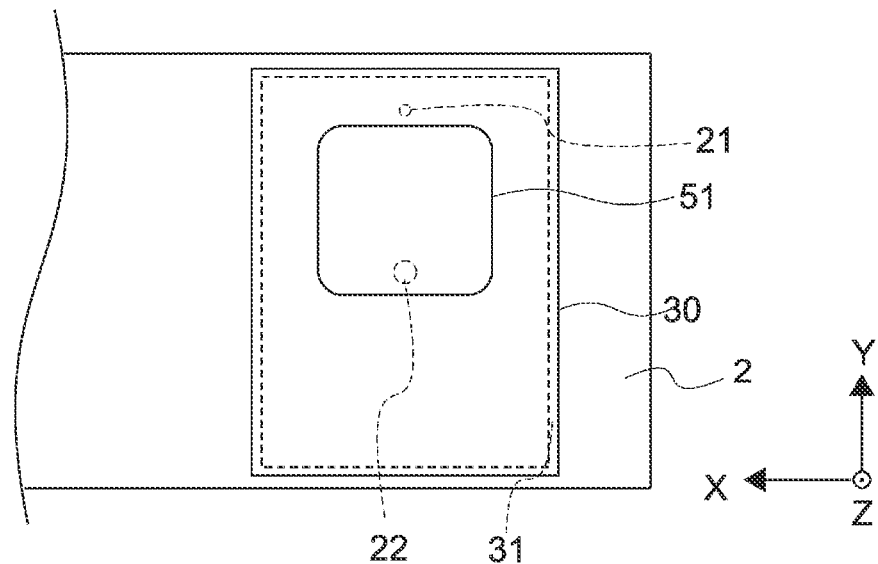
FIG. 24 is a view showing an arrangement example of another foam sheet.
Figure 25:
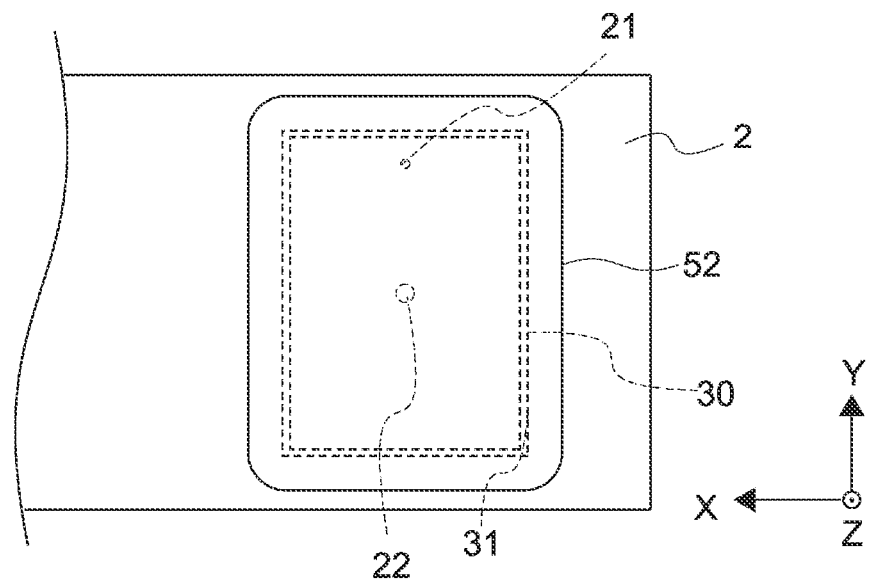
FIG. 25 is a view showing an arrangement example of yet another foam sheet.

For example, as shown in FIG. 24, a foam sheet 51 having a substantially rectangular shape having a surface area smaller than a half or less of a region partitioned by the double-sided adhesive sheet 31 having the frame shape may be arranged at off-center. In addition, as shown in FIG. 25, the foam sheet 52 may be formed so as to cover all of the elastic layer 30.

Sixth Embodiment

In each of the above-described embodiments, it illustrates that the surface of the elastic layer 30 is smooth with no concave-convex portions. However, a protrusion having an any shape may be arranged on the surface of the elastic layer. For example, the protrusion may be formed by embossing.

By arranging the protrusion on the surface of the elastic layer, at the time of expansion of the elastic layer, a change by expansion with a protrusion shape is newly added, the user can be provided with skin stimulation haptic feedback different from that provided in a case where no protrusion is arranged.

FIG. 26 to FIG. 30 are examples of the protrusion shapes formed on the surface of the elastic layer. Each Fig. (A) is a schematic cross-sectional view of the controller, and the double-sided adhesive sheet, the air pump, the vent, and the inlet are not shown. Each Fig. (B) is a schematic top view of the elastic layer for describing a planar shape of the protrusion.

Figure 26:
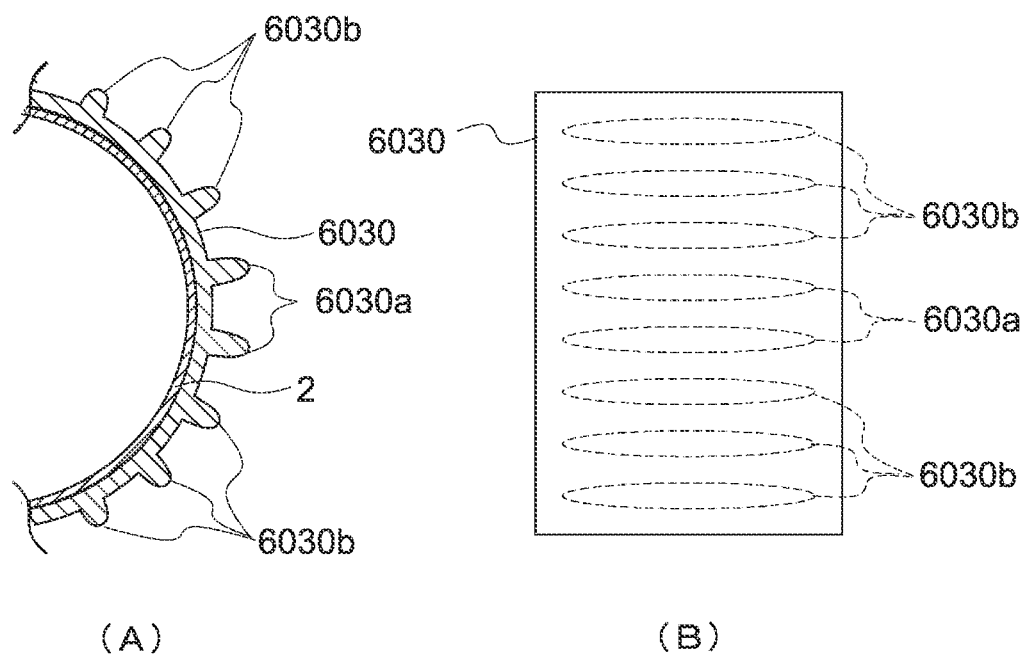
FIG. 26 are a partial cross-sectional view and a partial top view of an elastic layer showing a surface shape example of the elastic layer in a sixth embodiment.

[As shown in FIGS. 26, on a surface of an elastic layer 6030, a total eight of protrusions 6030a and 6030b having slender and almost oval planar shapes are arranged in parallel. The longitudinal directions of the protrusions 6030a and 6030b are in parallel with the short directions of the elastic layer 6030 having a rectangular planar contour.

Respective lengths of the protrusions 6030a and 6030b are the same in the longitudinal directions. The center two protrusions 6030a of the eight protrusions are higher than the rest six protrusions 6030b. Thus, a region in which the higher two protrusions 6030a are arranged can provide the user with the feeling of pressure stronger than that in a region in which the rest six protrusions 6030b are arranged.

Figure 27:
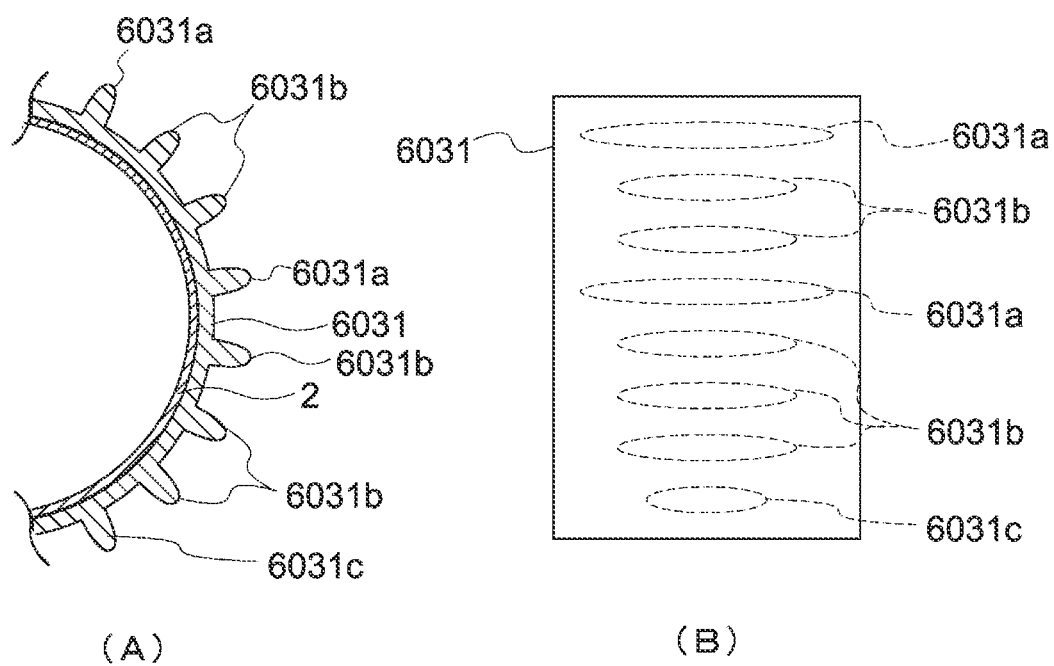
FIG. 27 show a surface shape example of another elastic layer.

As shown in FIGS. 27, on a surface of the elastic layer 6031, a total eight of protrusions 6031a, 6031b, and 6031c having different long axes lengths and slender and almost oval planar shapes are arranged in parallel. The longitudinal directions of the protrusions 6031a, 6031b, and 6031c are in parallel with the short directions of the elastic layer 6031 having a rectangular planar contour.

The respective protrusions 6031a, 6031b, and 6031c have the same height and different long axes lengths. The long axes of the protrusions 6031a are the longest, the long axes of the protrusions 6031b are the next longer, and the long axes of the protrusions 6031c are the shortest. Thus, by arranging the protrusions having the different long axes, it can adjust the region in which the user is provided with the feeling of pressure.

Figure 28:
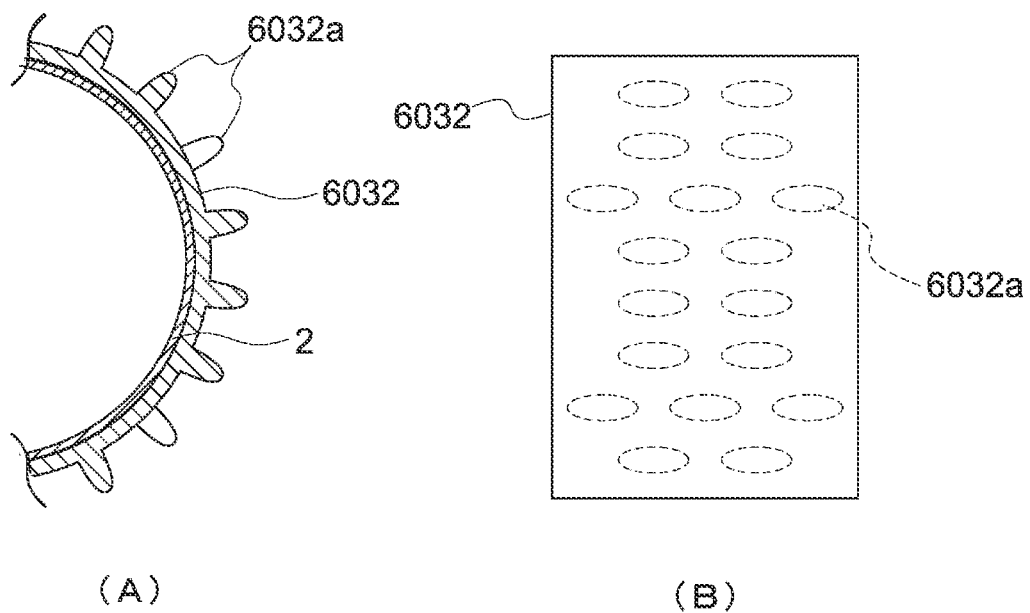
FIG. 28 show a surface shape example of yet another elastic layer.

As shown in FIGS. 28, on the surface of an elastic layer 6032, a plurality of protrusions 6032a having planar shapes of ovals may be arranged in island shapes. Each long axis of the oval of the planar shapes of the protrusions 6032a is in parallel with a short direction of the elastic layer 6032 having a rectangular planar contour.

Figure 29:
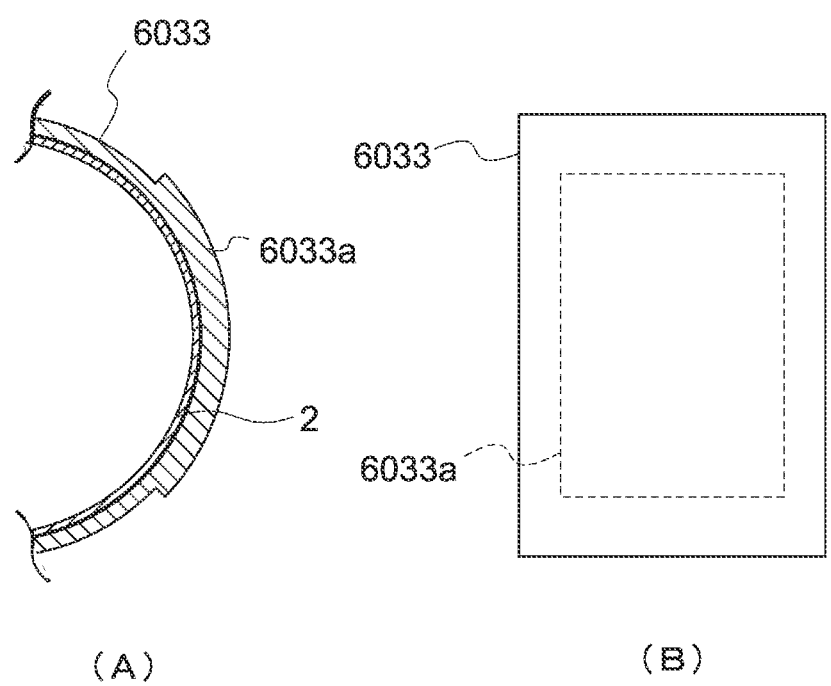
FIG. 29 show a surface shape example of yet another elastic layer.

As shown in FIGS. 29, on a surface of an elastic layer 6033, one protrusion section 6033a having a rectangular planar shape may be arranged. The protrusion section 6033a has a planar shape slightly smaller than a rectangular contour of the elastic layer 6033. The elastic layer 6033 has partially different thicknesses.

Thus, by arranging the protrusion section 6033a, the region in which the surface deformation apparatus is arranged can be thickened. As compared with the shape including no protrusion section, the user can be provided with the stronger feeling of pressure.

Figure 30:
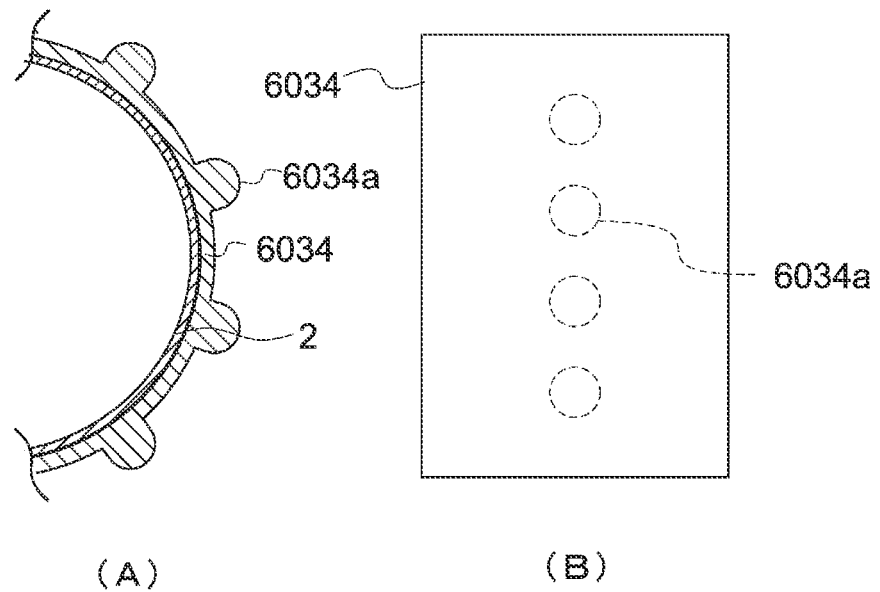
FIG. 30 show a surface shape example of yet another elastic layer.

As shown in FIGS. 30, on a surface of the elastic layer 6034, a plurality of, here four, protrusions 6034a having circle planar shapes may be arranged. The four circle protrusions 6034a are arranged in a direction in parallel with the longitudinal direction of the elastic layer 6034 having a rectangular planar contour.

Figure 31:
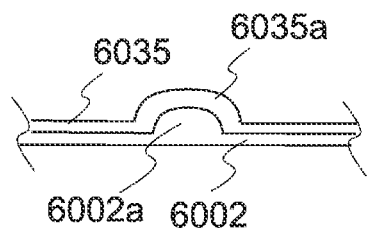
FIG. 31 shows a surface shape example of yet another elastic layer.

In each of the above-described embodiments, the surface of the region in which the elastic layer is arranged of the base material body 2 is a smooth curved surface with no concave-convex portions. However, as shown in FIG. 31, by arranging an elastic layer 6035 along a surface of a base material 6002 having a protrusion 6002a, a protrusion 6035a may be arranged on the elastic layer 6035.

Seventh Embodiment

In each of the above-described embodiments, the surface deformation apparatus is arranged on the gripper of the haptic presentation apparatus, but it is not limited thereto. For example, the surface deformation apparatus may be arranged in an inner wall surface of an external section of the haptic presentation apparatus. The external section includes a third space capable of accommodating the user's body part.

With such a structure, by inserting the user's body part into the third space of the external section and driving the air pump of the surface deformation apparatus, the inserted body part can be provided with the feeling of pressure.

Figure 32:
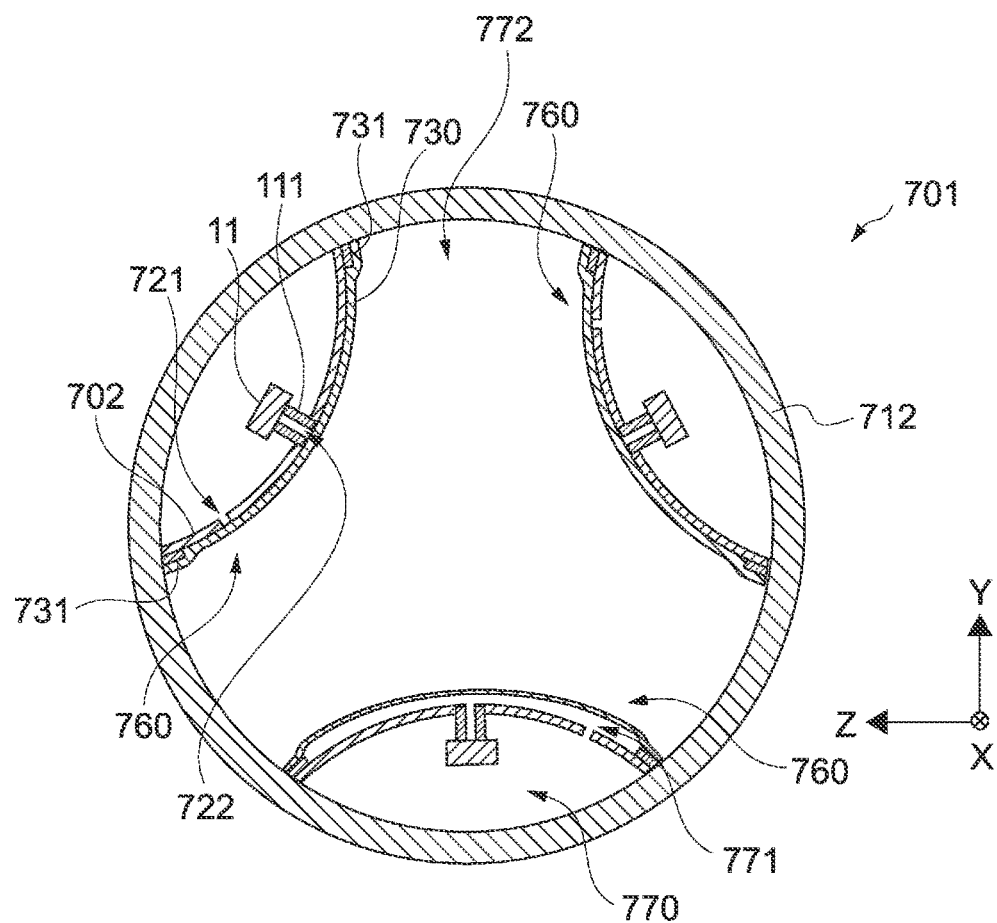
FIG. 32 is a cross-sectional view of a haptic presentation apparatus in a seventh embodiment.

FIG. 32 is a cross-sectional view of a haptic presentation apparatus 701 in this embodiment. The haptic feedback presentation apparatus 701 includes an external section 712 and three surface deformation apparatuses 760. The external section 712 includes a third space 772 into which the body part can be inserted.

The external section 712 is formed, for example, of a ring shape, and a finger, an arm, a foot, a head, or the like may be inserted into the third space 772. Incidentally, this embodiment illustrates that three surface deformation apparatuses 760 are arranged, but the number, the size, the shape, and the like of the surface deformation apparatus 760 are not limited to those described here.

The surface deformation apparatus 760 includes a base material 702, an elastic layer 730, the air pump 11 as a fluid transport apparatus that can supply air as fluid, and a double-sided adhesive sheet 31.

The base material 702 is arranged in the inner wall surface of the external section 712 in a convex shape. The base material 702 forms a first space 770 in the third space 772 together with the inner wall surface of the external section 712. The base material 702 is formed of a material difficult to be deformed by an internal pressure rise in a second space 771 by driven the air pump 11 and injecting air into the second space 771 formed between the elastic layer 730 and the base material 702.

The base material 702 includes an inlet 722 as the first through hole and a vent 721 as the second through hole. To the inlet 722, the nozzle 111 of the air pump 11 is connected. The inlet 722 is arranged to be positioned almost at the center of a region surrounded by the double-sided adhesive sheet 731, and the vent 721 is arranged around a periphery of a region surrounded by the double-sided adhesive sheet 731.

The elastic layer 730 is formed of an air impervious sealing material having an excellent extensible property similar to the first embodiment. The elastic layer 730 is adhered to a surface of the base material 702 via the double-sided adhesive sheet 731 having a frame shape arranged along its outer periphery.

The surface of the base material 702 covered by the elastic layer 730 has a convex curved surface. Since the region in which the elastic layer 730 is arranged is thus the convex surface, the elastic layer 730 can be made to be deformed with a low amount of air as compared with the case that the elastic layer is arranged on the planar surface and air is injected to expand.

Furthermore, in this embodiment, the second space 771 is formed of the elastic layer 730 and the base material 702 including a material difficult to be deformed by the air injection. This allows the elastic layer 730 to be deformed so as to lift the elastic layer 30 from the base material body 2 even if an air volume amount supplied to the second space 771 is low.

Thus, since it allows the elastic layer 30 to be deformed with the low air volume, the deformation status of the surface deformation apparatus can be switched in a short time and it allows various haptic feedback to be presented to the user.

An internal pressure between the elastic layer 730 and the base material 702 becomes higher than an internal pressure of the first space 770 by injecting air supplied from the air pump 11. Thus, the internal pressure of the second space 771 allows the elastic layer 730 to be expanded so as to spread in the outside direction.

Similar to the first embodiment, the volume of the second space 771 is in the status of almost zero before air is injected from the air pump 11. When the air pump 11 is driven and air is injected into the second space 771, the elastic layer 730 is expanded.

When driving of the air pump 11 is stopped, the air injected into the second space 771 is vented to the first space 770 via the vent 721 and the air pump 11 due to the elastic force that the elastic layer 730 tries to return to an original shape. Thus, the second space 771 becomes contracted and the volume returns to the status of almost zero again.

Thus, the haptic presentation apparatus may have a structure into which the body parts can be inserted.

Eighth Embodiment

Next, an application example of a seventh embodiment will be described. In an eighth embodiment, the haptic presentation apparatus includes a glove-shaped external section and the surface deformation apparatus is arranged inside of the glove into which the fingers and the palm of the user's body part are inserted. By wearing the glove on the hand, the user feels the haptic feedback that something is grabbed or the like.

FIG. 33(A) is a conceptual diagram for describing a glove-shaped haptic presentation apparatus 801. FIG. 34 is a partial enlarged cross-sectional view of the haptic presentation apparatus 801. The haptic presentation apparatus 801 includes a glove body 810 as the external section and a surface deformation apparatus 860. In the figures, each component is conveniently not to scale.

In the figures, regions enclosed with circles are stimulating regions 880 with respect to the body part by the surface deformation apparatuses 860. The surface deformation apparatus 860 is arranged so as to stimulate each of a thumb pulp, an index finger pulp, a middle finger pulp, and a palm.

The surface deformation apparatus 860 includes a base material 802 including a first space 870 having an inlet 822 and a vent 821, an elastic layer 830, and the air pump 11.

The base material 802 and the elastic layer 830 are arranged on each stimulating region 880, but the air pump 11 is not necessarily arranged on each stimulating region 880. In a case where no air pump 11 is arranged on the stimulating region 880, the air pump is connected to the inlet of the base material via a piping 881.

In this embodiment, the air pump 11 of the surface deformation apparatus 860 that stimulates the finger pulp is connected to the inlet 822 via the piping 881 and is arranged near a finger base. On the other hand, the air pump 11 of the surface deformation apparatus that stimulates the palm is arranged in the stimulating region 880.

In addition, in this embodiment, the air pump 11 of the surface deformation apparatus that stimulates the index finger pulp is common to the air pump 11 of the surface deformation apparatus that stimulates the middle finger pulp and it is configured that one air pump stimulates the two different regions.

Thus, the elastic layer of the surface deformation apparatus that stimulates the index finger pulp and the elastic layer of the surface deformation apparatus that stimulates the middle finger pulp are expanded substantially at the same time by driving the common air pump 11.

On the other hand, the air pump 11 of the surface deformation apparatus that stimulates the thumb pulp and the air pump 11 of the surface deformation apparatus that stimulates the palm are independently arranged from the air pump 11 of the surface deformation apparatus that stimulates the index finger pulp and the middle finger pulp, and are separately controlled.

FIG. 33(B) is a conceptual diagram for describing other example of a glove-shaped controller 1801. As shown in FIG. 33(B), the air pump 11 may be separately arranged for each stimulating region 880 and may separately control each region.

FIG. 34 is a partial schematic cross-sectional view of the haptic presentation apparatus 801 for describing an internal structure of a finger part of the glove-shaped haptic presentation apparatus 801. The surface deformation apparatus 860 includes the base material 802, the elastic layer 830, the air pump 11 as the fluid transport apparatus that can supply air as fluid, and the piping 881.

The base material 802 is arranged with respect to the body part to be stimulated in a convex shape. The base material 802 has a hollow shape in which a first space 870 is formed.

The base material 802 is formed of a material having some degree of hardness such as plastic and metal. The material is difficult to be deformed by an internal pressure rise in a second space 871 by driven the air pump 11 and injecting air into the second space 871 formed between the elastic layer 830 and the base material 802.

The base material 802 includes the inlet 822 as the first through hole and the vent 821 as the second through hole. The nozzle of the air pump 11 is connected to the inlet 822 via the piping 881.

The elastic layer 830 is formed of an air impervious sealing material having an excellent extensible property similar to the first embodiment. The elastic layer 830 is adhered to a surface of the base material 802 via a double-sided adhesive sheet 831 having a frame shape for punching arranged along its outer periphery. The surface covered by the elastic layer 830 of the base material 802 has a convex curved surface. The elastic layer 830 is arranged on the surface of the base material 802 so as to cover the inlet 822 and the vent 881.

The internal pressure between the elastic layer 830 and the base material 802 becomes higher than the internal pressure of the first space 870 by injecting air supplied from the air pump 11 with the air pump 11 driven.

An internal pressure rise of the second space 871 allows the elastic layer 830 to be expanded so as to spread in the outside direction, The elastic layer 830 is arranged at inner surface side of the glove body 810. When the user wears the glove-shaped haptic presentation apparatus 801, it is arranged such that the body part to be stimulated comes in contact with the elastic layer 830. in the status of The volume of the second space 871 is in the status of almost zero before air is injected from the air pump 11. When the air pump 11 is driven and air is injected into the second space 871, the elastic layer 830 is expanded.

When driving of the air pump 11 is stopped, the air injected into the second space 871 is vented to the first space 870 via the vent 821 and the air pump 11 due to the elastic force that the elastic layer 830 tries to return to an original shape. Thus, the second space 871 becomes contracted and the volume returns to the status of almost zero again.

By using reversible deformation by expansion and contraction of the elastic layer 830, the user can be provided with various haptic feedback. For example, by driving the surface deformation apparatus corresponding to all of the thumb pulp, the index finger pulp, the middle finger pulp, and the palm, the user receives a repellent force on each finger pulp and the palm and feels the haptic feedback of grabbing an object.

Figure 34:
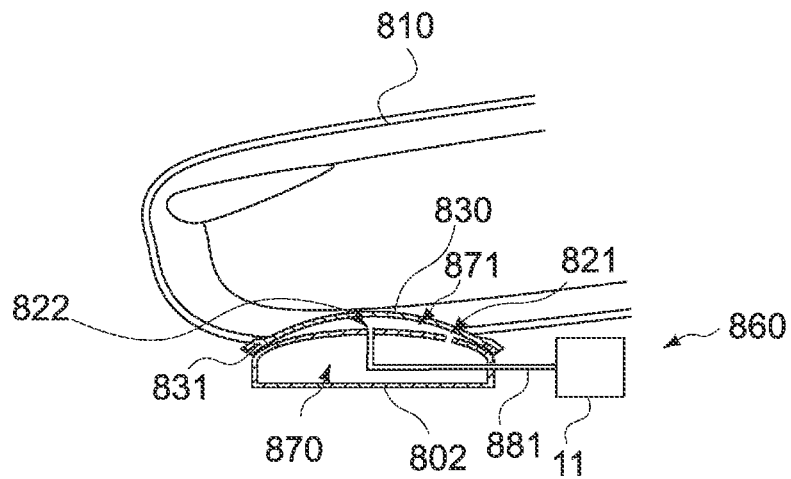
FIG. 34 is a partial schematic cross-sectional view of the haptic presentation apparatus for describing an internal structure of a finger part of the glove-like haptic presentation apparatus of FIGS. 33.
Figure 35:
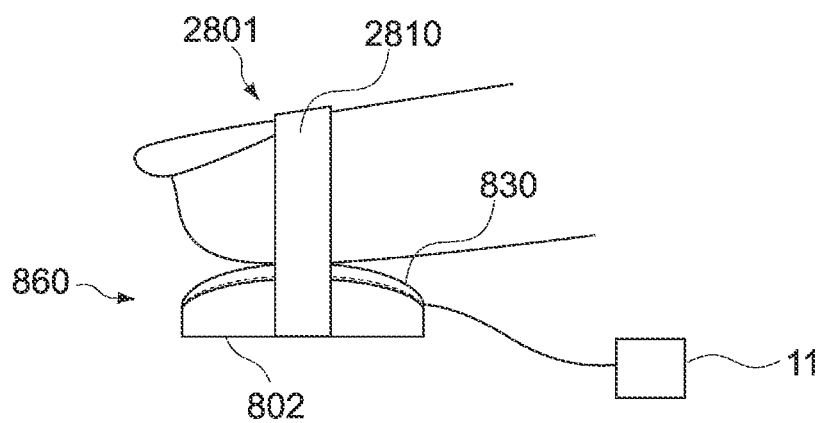
FIG. 35 is a schematic view of another haptic presentation apparatus that stimulates a finger pulp.

FIG. 35 is a schematic view of another haptic presentation apparatus that stimulates the finger pulp. Configurations similar to FIG. 34 are denoted by the similar reference signs and the description is omitted.

A haptic presentation apparatus 2801 shown in FIG. 35 includes the surface deformation apparatus 860 and a fastening belt 2810. The fastening belt 2810 is for fixing the body part to be stimulated to the surface deformation apparatus 860.

Figure 33:
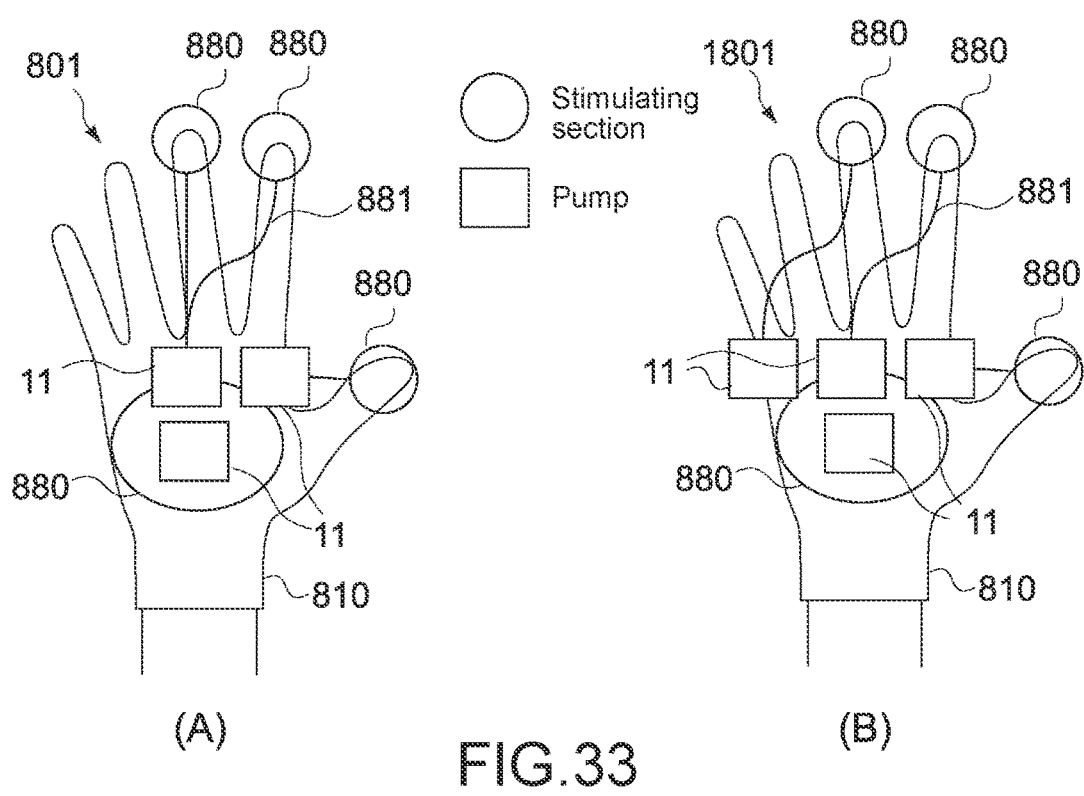
FIG. 33 are conceptual diagrams for describing a glove-like haptic presentation apparatus in an eighth embodiment.

Each of the haptic presentation apparatuses 801 and 1801 shown in FIG. 33 maintains the contact between the body part to be stimulated and the elastic layer of the surface deformation apparatus by the glove body 810. In contrast, in the haptic presentation apparatus 2801 shown in FIG. 35, the body part to be in contacted is fixed with the fastening belt 2810 and the contact between the body part and the elastic layer of the surface deformation apparatus is maintained.

Figure 36:
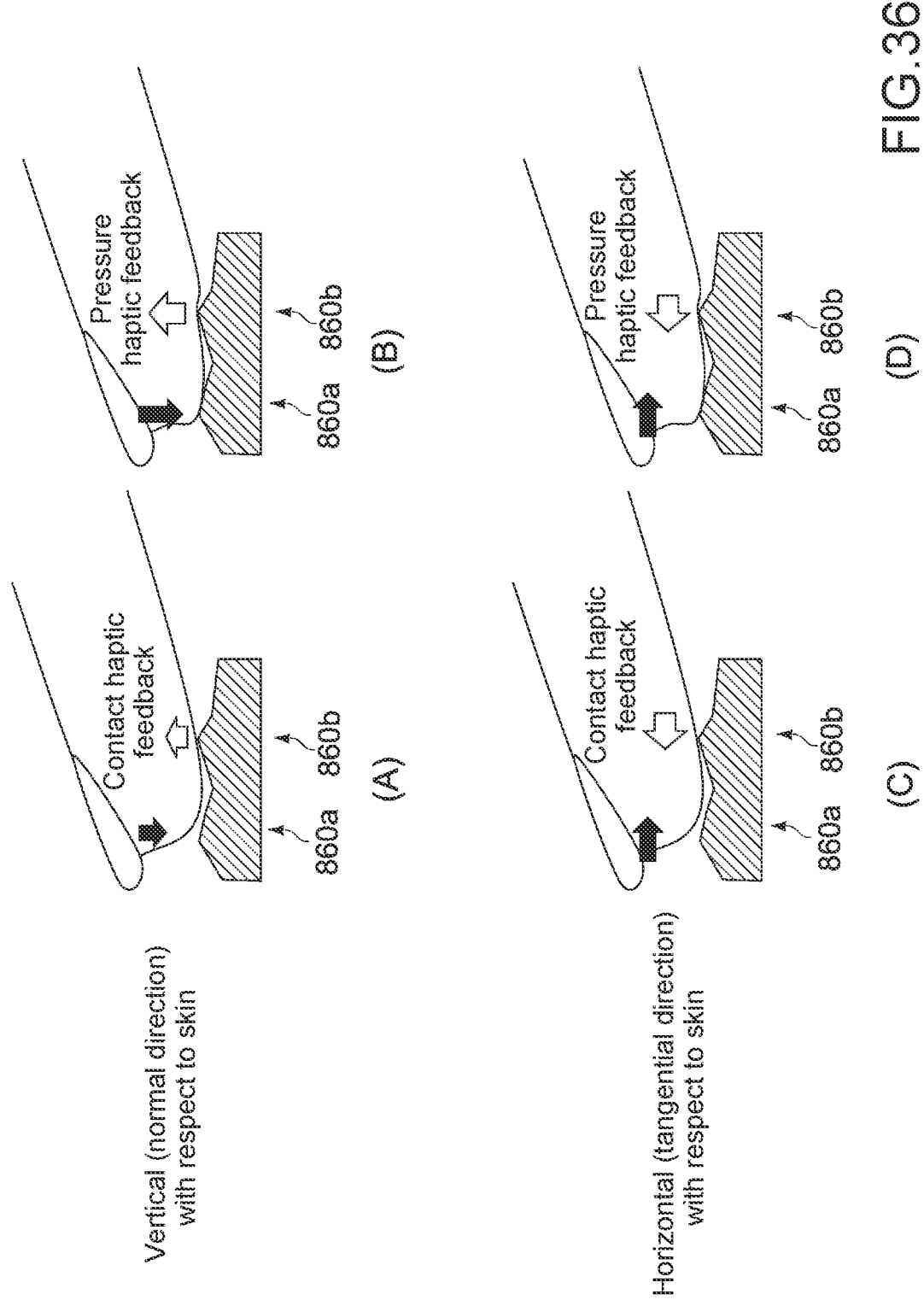
FIG. 36 are views for describing haptic feedback given to a finger using the surface deformation apparatus.

FIG. 36 are views for describing the haptic feedback given to a finger using the surface deformation apparatus 860. In FIGS. 36, there are arranged two first surface deformation apparatus 860a and a second surface deformation apparatus 860b capable of being individually controlled with respect to one finger pulp in a length direction of the finger, for example. Incidentally, the number and the arrangement of the surface deformation apparatus are not limited thereto.

As shown in FIG. 36(A), the expanded elastic layer of the surface deformation apparatus 860a is contracted and the contracted elastic layer of the second surface deformation apparatus 860b is expanded at the same time such that a deformation amount caused by expansion is relatively decreased. Thus, the user can be provided with the haptic feedback that something becomes in contact with a skin of the finger pulp in the vertical direction.

As shown in FIG. 36(B), the expanded elastic layer of the surface deformation apparatus 860a is contracted and the contracted elastic layer of the second surface deformation apparatus 860b is expanded at the same time such that the deformation amount caused by contraction and the deformation amount caused by expansion are increased higher than those of FIG. 36(A). Thus, the user can be provided with the haptic feedback that something is pushed in the vertical direction with respect to the skin.

As shown in FIG. 36(C) and FIG. 36(D), the surface deformation apparatus 860a and the surface deformation apparatus 860b are driven in turn by shifting driving timing. Thus, the skin of the user can be provided with the haptic feedback that the skin is pulled in the horizontal direction from the left to right in the figures.

On the other hand, by driving the surface deformation apparatus 860b and the surface deformation apparatus 860a in turn, the skin of the user can be provided with the haptic feedback that the skin is pulled in the horizontal direction from the right to left in the figures.

In a case where the two surface deformation apparatuses by shifting the driving timing, by relatively decreasing a degree of expansion of the surface deformation apparatus, the user can be provided with a feeling that something crawls on the skin surface, for example, as shown in FIG. 36(C).

On the other hand, by relatively increasing the degree of expansion, the user can be provided with a feeling that something passes through the finger pulp so as to dig into the skin, as shown in FIG. 36(D).

In addition, the user is caused to wear on the thumb and the index finger the haptic presentation apparatuses including the surface deformation apparatus that is fixed to the finger with the fastening belt as shown in FIG. 35, for example, and the both skins of the thumb and the index finger are stimulated in a horizontal movement direction as shown in FIG. 36(D). Thus, the user can be provided with the haptic feedback that something is pinched.

The contact haptic feedback that is a feeling of changing a non-contact status to a contact status and the pressure haptic feedback that is a feeling when the skin is further pressed in or is deformed in the horizontal direction from the contact status are classified by stimulation directions. The stimulation directions are classified into the normal stimulation normal direction with respect to the object shown in FIG. 36(A) and FIG. 36(B) and the tangential stimulation direction with respect to the object shown in FIG. 36(C) and FIG. 36(D). By combining them, the skin of the user's body part being in contact with the elastic layer can be provided with various stimulation.

Ninth Embodiment

In each of the above-described embodiments, the vent as the second through hole of the surface deformation apparatus is arranged in the base material body or the base material, and air in the second space between the elastic layer and the base material is vented to the first space formed by the base material or the base material body as the outside of the second space via the vent.

In contrast, in this embodiment, the second through hole (vent) is arranged not in the base material or the base material body but in the elastic layer.

Figure 37:
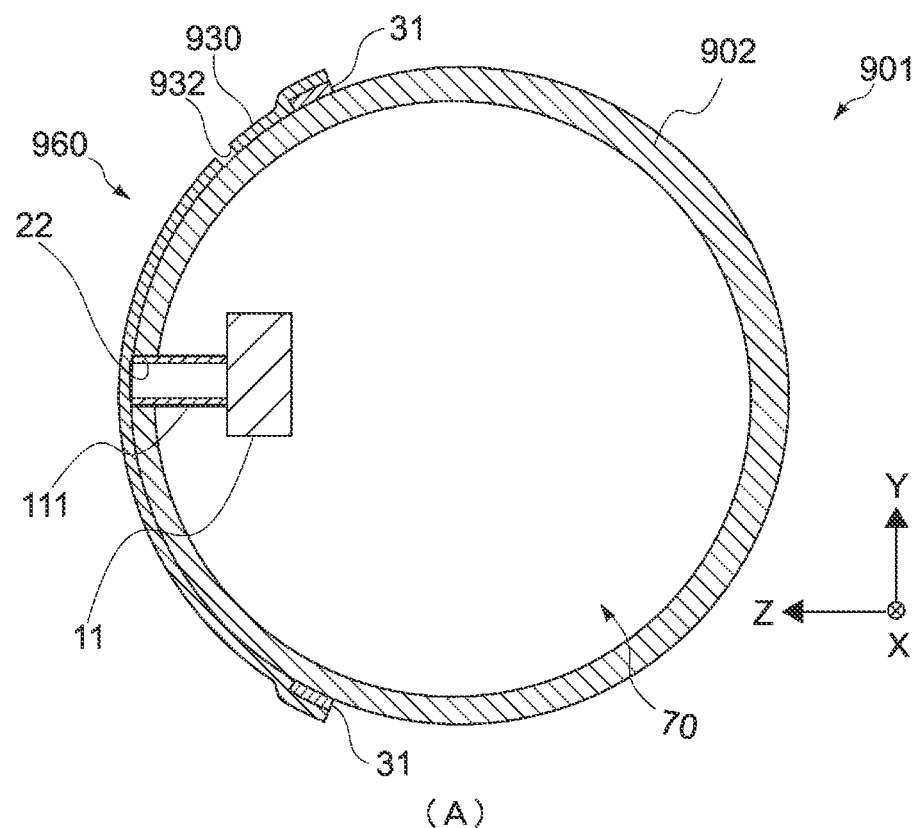
FIG. 37 are a cross-sectional view and a partial top view of the haptic presentation apparatus in a ninth embodiment.
Figure 37:
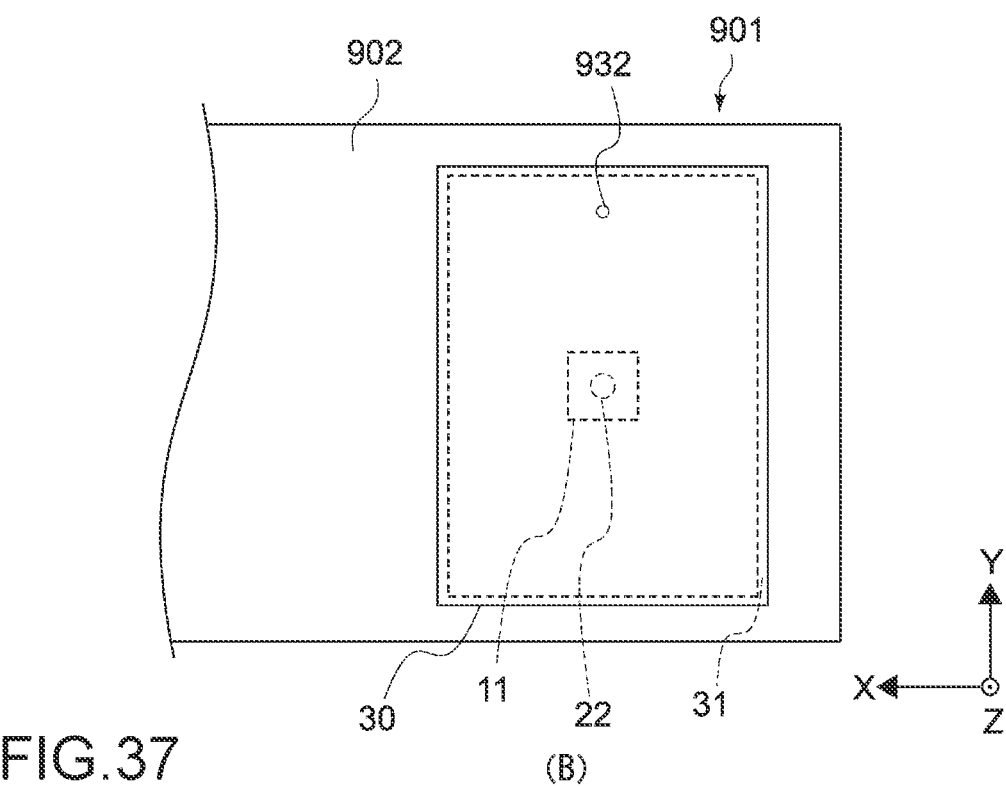

FIG. 37(A) is a cross-sectional view of a controller 901 as the haptic presentation apparatus according to this embodiment in a case where a region in which a deformed part of a surface deformation apparatus 960 is arranged is cut in a plane orthogonal to a longitudinal direction. FIG. 37(B) is a partial top view of the controller 901. As compared with the first embodiment, only the configurations of the base material body and the elastic layer are different and other configurations are the same. Hereinafter, similar configurations are denoted by the similar reference signs.

The controller 901 includes a base material body 902 and a surface deformation apparatus 960. The base material body 902 has almost the same configuration as the base material body 2 in the first embodiment and has a structure that the vent is excluded from the base material body 2.

The surface deformation apparatus 960 includes the base material body 902, an elastic layer 930, the air pump 11 as the fluid transport apparatus that can supply air as fluid, and the double-sided adhesive sheet 31. The base material body 902 has the inlet 22 as the first through hole. The elastic layer 930 has a vent 932 as the second through hole. To the inlet 22, the nozzle 111 of the air pump 11 is connected.

The elastic layer 930 is arranged on the surface of the base material 902 so as to cover the inlet 22. In this embodiment, by injecting air supplied from the air pump 11 between the elastic layer 930 and the base material 902, an internal pressure in a second space formed between the elastic layer 930 and the base material 902 becomes higher than an internal pressure of the first space 70 formed by the base material 902 and the elastic layer 930 is expanded.

At the time of driving the air pump 11, the air in the second space is vented to outside via the vent 932 so as not to interfere the expansion of the elastic layer 930. In addition, by stopping the air pump 11, the air in the second space is vented to outside of the controller 901 via the vent 932 and to the first space 70 via a vent valve (not shown) of the air pump 11.

According to this embodiment, air is jetted from the vent 932 of the elastic layer 930 to outside of the controller 901. In this manner, air is blown to the skin of the user and the haptic stimulation can be provided. Thus, the user can be provided with both of the pseudo haptic feedback caused by expansion of the elastic layer 930 and the haptic stimulation caused by air jetting, and further various haptic feedback can be presented.

Tenth Embodiment

Figure 38:
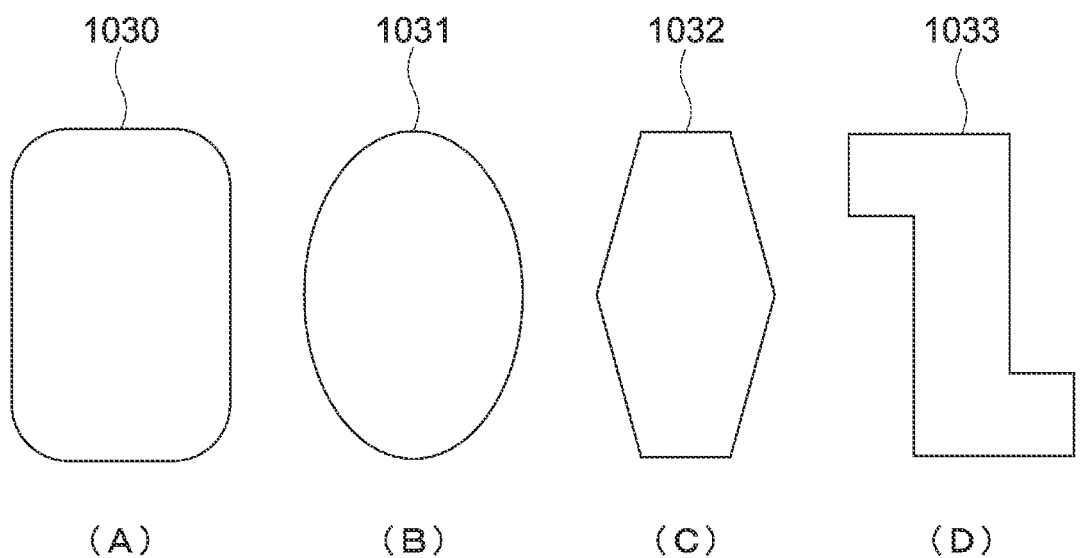
FIG. 38 show another planar shapes of the elastic layer in a tenth embodiment.

In each of the above-described embodiments, the planar shape of the elastic layer forming a part of the surface deformation apparatus is mainly rectangular, but it is not limited thereto. FIG. 38 show other examples of the planar shape of the elastic layer.

As shown in FIG. 38(A), an elastic layer 1030 may have a substantially rectangular shape with round corners. As shown in FIG. 38(B), an elastic layer 1031 may have an oval shape. In addition, as shown in FIG. 38(C), an elastic layer 1032 may have a slender hexagonal shape. As shown in FIG. 38(D), an elastic layer 1033 may have a substantially Z shape.

Respective embodiments of the present technology are described above. The present technology is not limited to only the above-described embodiments. It should be appreciated that variations and modifications may be made without departing from the scope of the present technology. For example, configurations of the respective embodiments may be combined. For example, the controller may include both of the inner package material and the outer package material.

In addition, the haptic presentation apparatus using the surface deformation apparatus that deforms the surface by a fluid supply is described. In addition thereto, a mechanism that applies vibration may be arranged. The combination allows to provide a more kinds of haptic feedback. As a vibration mechanism, a vibration motor, a voice coil motor, a piezoelectric element, or the like can be used.

The region of the base material covered by the elastic layer of the surface deformation apparatus may have a modulus of elasticity and a shape that is not easily deformable by the increase of the internal pressure caused by fluid suction. Also, the base material may be a display apparatus. Furthermore, the base material may have a heat generating function.

In the above-described embodiments, as application examples of the surface deformation apparatus, the controller of the game machine gripped by a hand and the glove-shaped haptic presentation apparatus are illustrated, but are not limited thereto. For example, it may be applied to a head mount display, a goggle, a head phone, a wrist band, a belt, a garment, etc. This allows the haptic feedback to be presented to the body part being in contact with the elastic layer of the surface deformation apparatus.

Examples of the haptic feedback to be presented include, stimulation by expansion deformation of the surface deformation apparatus, a feeling of pressure and elasticity when it touches something, heartbeat, a feeling of something wriggling, a feeling of fluttering, a feeling of reaction when something is attacked, a feeling of reaction when something is keystroked, and the like.

In addition, in the above-described embodiments, it illustrates that it is applied to the controller or the like of the game machine and various haptic feedback is presented to the user according to events in the game, but it is not limited thereto. For example, the surface deformation apparatus may be arranged on a car steering wheel, a walking stick, a wristwatch, shoes, a ring, or the like.

In a case where the surface deformation apparatus is arranged on the car steering wheel, a plurality of the surface deformation apparatuses is arranged on a region of a gripper of the steering wheel, for example, and a sensor that detects a region gripped by the user and a control section are further arranged.

In a case where the control section senses a situation that any danger may occur, the sensor detects a grip region, drives the surface deformation apparatus on the detected region, and alerts to the user. The user can detect expansion of an elastic part by a palm by driving the surface deformation apparatus and sense the situation that any danger may occur.

Thus, the user may be provided with the haptic feedback to issue an alert. In addition, an alert may be issued for not only a danger but also a direction pointing.

In addition, it may be also applied to a handle of a motorbike, a bicycle, or the like other than the car steering wheel. In these cases, since the region to be gripped is almost specified, the sensor for detecting the grip region may not be especially arranged.

In a case where the surface deformation apparatus is arranged on the walking stick, the surface deformation apparatus is arranged on a region of a gripper of the walking stick, for example. In a case where the surface deformation apparatus is arranged on the wristwatch, the surface deformation apparatus is arranged inside of a belt, for example. In a case where the surface deformation apparatus is arranged on the shoes, the surface deformation apparatus is arranged on insoles of the shoes such that soles of feet can be stimulated, for example. In a case where the surface deformation apparatus is arranged on the ring, the surface deformation apparatus is arranged on an inner side surface of the ring, for example.

Then, by driving the surface deformation apparatus, the body part of the user being in contact with the elastic layer of the surface deformation apparatus is provide with the feeling of pressure. Thus, an improvement of blood circulation by compression and stimulation in a rhythmic manner, notification for issuing an alert by the haptic presentation, or the like can be performed, for example.

In addition, the surface deformation apparatuses are arranged on both feet of the user, for example, and the pressure and the stimulation are applied to only one foot by the surface deformation apparatus. It can be used for information notification that notifies the user of a direction to be followed.

Furthermore, it is also possible to apply to a surgery training simulator. The surgery training simulator includes a head mount display that shows a state of a surgery part and the haptic presentation apparatus considered as surgery instruments.

The user wears the head mount display and holds the haptic presentation apparatus by hand while seeing the state of the surgery part shown on the head mount display. Thus, the user can perform a training of operative procedures while acquiring a soft touch feeling when the surgery instruments touch organs, i.e., a touch feeling as if there are real substances, for example, by driving the surface deformation apparatus.

Note that the present technology may also have the following structures.

(1) A haptic presentation apparatus, including:
  a base material that forms a first space, the base material including a first through hole;
  an elastic layer that covers a surface of the base material including the first through hole; and
  a fluid transport apparatus that injects fluid between the elastic layer and the base material via the first through hole, in which
  the elastic layer is expanded by injecting the fluid from the fluid transport apparatus such that an internal pressure of a second space between the elastic layer and the base material is higher than an internal pressure of the first space, and the fluid injected into the second space is vented to outside of the second space via a second through hole by stopping driving of the fluid transport apparatus.
(2) The haptic presentation apparatus according to (1), in which
  the elastic layer is formed to be capable of coming in contact with a body part of a user, and
  a region of the base material covered by the elastic layer has a convex surface with respect to the body part.
(3) The haptic presentation apparatus according to (1) or (2), in which
  the region of the base material covered by the elastic layer has a convex curved surface.
(4) The haptic presentation apparatus according to (3), in which
  the elastic layer has a shape including a longitudinal direction, and
  the elastic layer is arranged such that the longitudinal direction is matched with a curved surface direction of the convex curved surface.
(5) The haptic presentation apparatus according to any one of (1) to (4), in which
  when driving of the fluid transport apparatus is stopped, a volume of the second space can be zero.
(6) The haptic presentation apparatus according to any one of (1) to (5), in which
  the fluid transport apparatus includes a vent valve that vents the fluid in the second space to the first space.
(7) The haptic presentation apparatus according to any one of (1) to (6), in which
  the second through hole is arranged in the base material, and
  the elastic layer covers a surface including the first through hole and the second through hole of the base material.
(8) The haptic presentation apparatus according to any one of (1) to (6), in which
  the second through hole is arranged in the elastic layer.
(9) The haptic presentation apparatus according to any one of (1) to (8), in which
  the base material includes a plurality of the first through holes,
  the fluid transport apparatus is arranged for each first through hole, and
  the elastic layer is arranged for each first through hole.
(10) The haptic presentation apparatus according to any one of (1) to (9), in which
  the second space formed between the elastic layer and the base material is divided into a plurality of regions through which fluid can move mutually.
(11) The haptic presentation apparatus according to any one of (1) to (10), in which
  the elastic layer has a partially different thickness.
(12) The haptic presentation apparatus according to any one of (1) to (11), in which
  the elastic layer has a protrusion on the surface.
(13) The haptic presentation apparatus according to any one of (1) to (12), in which
  a protrusion is arranged on a part of the region covered by the elastic layer of the base material.
(14) The haptic presentation apparatus according to any one of (1) to (13), further including:
  an inner package material arranged between the base material and the elastic layer.
(15) The haptic presentation apparatus according to any one of (1) to (14), further including:
  an outer package material arranged on a surface of the elastic layer at an opposite side in which the base material is arranged.
(16) The haptic presentation apparatus according to any one of (1) to (15), in which
  the elastic layer is arranged on a gripper gripped by the user.
(17) The haptic presentation apparatus according to any one of (1) to (15), further including:
  an external section having a third space, wherein the base material forms the first space together with an inner wall surface of the external section in the third space.

REFERENCE SIGNS LIST 1, 301, 401, 501, 701, 901, 1001, 1101, 1201, 1301 controller (haptic presentation apparatus)
2, 902 base material body (base material)
11 air pump (fluid transport apparatus)
21, 721, 821, 932 vent (second through hole)
22, 722, 822 inlet (first through hole)
730, 830, 930, 1030, 1031, 1032, 1033, 6030, 6031, 6032, 6033, 6034 elastic layer
41 foam sheet (inner package material)
51, 52 foam sheet (outer package material)
770 first space
71, 171, 771 second space
113 vent valve
171a first expansion region (region through which fluid can move)
171b second expansion region (region through which fluid can move)
712 base material
772 third space
801 glove-shaped haptic presentation apparatus
810 glove body (external material)
2801 haptic presentation apparatus
6030a, 6030b, 6031a, 6031b, 6031c, 6032a, 6033a protrusion

The invention claimed is:

1. A haptic presentation apparatus, comprising:
a base material that includes a first space, the base material including a first through hole;
an elastic layer above a surface of the base material including the first through hole; and
a fluid transport apparatus that injects fluid between the elastic layer and the base material via the first through hole,
wherein
the elastic layer is expanded by injecting the fluid from the fluid transport apparatus such that an internal pressure of a second space between the elastic layer and the base material is higher than an internal pressure of the first space, and
the fluid transport apparatus includes a vent valve that vents the fluid in the second space to the first space, and
a wall separating the first space and the second space including a second through hole that vents the fluid in the second space to the first space.

2. The haptic presentation apparatus according to claim 1, further comprising an outer package material above the elastic layer.

3. The haptic presentation apparatus according to claim 1, further comprising a fluid pass between the fluid transport apparatus and the first through hole.

4. The haptic presentation apparatus according to claim 3, further comprising a valve on the fluid pass.

5. The haptic presentation apparatus according to claim 1, wherein when driving of the fluid transport apparatus is stopped, a volume of the second space can be zero.

6. The haptic presentation apparatus according to claim 1, wherein a region of the base material covered by the elastic layer has a convex surface with respect to the body part.

7. The haptic presentation apparatus according to claim 6, wherein the region of the base material covered by the elastic layer has a convex curved surface.

8. The haptic presentation apparatus according to claim 1, wherein a region of the base material covered by the elastic layer has a concave surface with respect to the body part.

9. The haptic presentation apparatus according to claim 8, wherein the region of the base material covered by the elastic layer has a concave curved surface.

10. The haptic presentation apparatus according to claim 1, wherein a region of the base material covered by the elastic layer has a flat surface with respect to the body part.

11. The haptic presentation apparatus according to claim 1, wherein the base material includes a plurality of through holes which are spaced around the base material.

12. The haptic presentation apparatus according to claim 1, wherein the elastic layer has a shape including a longitudinal direction which is matched with a curved surface direction of a convex curved surface.

13. The haptic presentation apparatus according to claim 1, wherein arrangement positions of a plurality of vents are configured to uniformly contract the elastic layer.

14. The haptic presentation apparatus according to claim 1, wherein the base material is not deformed by a pressure rise in the second space.

15. The haptic presentation apparatus according to claim 1, wherein the second space is divided into a plurality of regions through which fluid can move mutually.

16. The haptic presentation apparatus according to claim 1, further comprising a double sided adhesive sheet adhered to a periphery of the elastic layer.

17. The haptic presentation apparatus according to claim 1, the elastic layer is configured to come into contact with a body part of a user.

18. The haptic presentation system according to claim 17, wherein the control device includes an information acquisition section, a communication section, and a driving control section.

19. The haptic presentation apparatus according to claim 1, wherein the base material includes a second through hole, and the elastic layer is configured to be in contact with one end of the second through hole until the internal pressure of the second space causes the elastic layer to expand away from the one end of the second through hole to allow fluid to vent into the first space from the second space.

20. The haptic presentation apparatus according to claim 1, wherein the second through hole is one of a plurality of second through holes in the base material.

21. The haptic presentation apparatus according to claim 20, wherein the first through hole is one of a plurality of first through holes in the base material.

22. A haptic presentation system comprising:
haptic presentation apparatus according to claim 1;
a control device; and
a pump.

* * * * *